(12) United States Patent
Huang et al.

(10) Patent No.: US 12,345,877 B2
(45) Date of Patent: Jul. 1, 2025

(54) OPTICAL DEVICE AND USE THEREOF

(71) Applicant: NINGBO SUNNY AUTOMOTIVE OPTECH CO., LTD., Yuyao Ningbo (CN)

(72) Inventors: Hujun Huang, Yuyao Ningbo (CN); Yuqing Ye, Yuyao Ningbo (CN); Rongwei Liu, Yuyao Ningbo (CN); Dong Luo, Yuyao Ningbo (CN)

(73) Assignee: NINGBO SUNNY AUTOMOTIVE OPTECH CO., LTD., Yuyao (CN)

( * ) Notice: Subject to any disclaimer, the term of this patent is extended or adjusted under 35 U.S.C. 154(b) by 740 days.

(21) Appl. No.: 17/619,967

(22) PCT Filed: Jun. 4, 2020

(86) PCT No.: PCT/CN2020/094311
§ 371 (c)(1),
(2) Date: Dec. 16, 2021

(87) PCT Pub. No.: WO2020/253541
PCT Pub. Date: Dec. 24, 2020

(65) Prior Publication Data
US 2022/0357572 A1 Nov. 10, 2022

(30) Foreign Application Priority Data

Jun. 17, 2019 (CN) .......................... 201910520733.0
Jul. 31, 2019 (CN) .......................... 201910699837.2

(51) Int. Cl.
*G02B 27/00* (2006.01)
*B29D 11/00* (2006.01)
*H05B 3/84* (2006.01)

(52) U.S. Cl.
CPC .... *G02B 27/0006* (2013.01); *B29D 11/00009* (2013.01); *H05B 3/84* (2013.01);
(Continued)

(58) Field of Classification Search
CPC .... G02B 27/0006; G02B 7/028; G02B 7/021; G02B 7/02; B29D 11/00009;
(Continued)

(56) References Cited

U.S. PATENT DOCUMENTS

| 11,249,372 B2* | 2/2022 | Choi ...................... H04N 23/50 |
| 2007/0076304 A1* | 4/2007 | Chen ...................... G02B 7/028 |
| | | 359/721 |

(Continued)

FOREIGN PATENT DOCUMENTS

| CN | 1940621 A | 4/2007 |
| CN | 204314585 U | 5/2015 |

(Continued)

*Primary Examiner* — Cara E Rakowski
*Assistant Examiner* — Jennifer A Jones
(74) *Attorney, Agent, or Firm* — Birch, Stewart, Kolasch & Birch, LLP

(57) ABSTRACT

An optical device and use thereof are provided. The optical device includes: at least one lens element, a lens barrel and at least one heating element, wherein the lens barrel has an installation cavity, the lens element is installed in the installation cavity, and the heating element is arranged to contact a surface of the lens element near an object side in a manner capable of being powered-on to generate heat; or, the heating element has at least two terminals, and at least two conductive elements are fixed at positions in contact and electrical connection with the corresponding terminals, respectively. According to the above technical solution, the heating element can generate heat, to heat the lens element so as to accelerate the dissipation of moisture attached to the surface, has an active defogging and defrosting function, and can prevent against fogging or frosting.

19 Claims, 16 Drawing Sheets

(52) U.S. Cl.
CPC .. *H05B 2203/007* (2013.01); *H05B 2203/013* (2013.01); *H05B 2203/016* (2013.01)

(58) Field of Classification Search
CPC ................ B29D 11/00807; H05B 3/84; H05B 2203/007; H05B 2203/013; H05B 2203/016; G03B 17/55
See application file for complete search history.

(56) References Cited

U.S. PATENT DOCUMENTS

| | | | |
|---|---|---|---|
| 2018/0176431 A1* | 6/2018 | Kim | G02B 27/0006 |
| 2018/0239105 A1* | 8/2018 | Lee | H04N 23/55 |
| 2021/0294066 A1* | 9/2021 | Hirata | H05B 1/0288 |
| 2022/0146777 A1* | 5/2022 | Inaba | G03B 17/02 |
| 2022/0163751 A1* | 5/2022 | Park | H05B 3/84 |

FOREIGN PATENT DOCUMENTS

| | | |
|---|---|---|
| CN | 206650748 U | 11/2017 |
| CN | 107490836 A | 12/2017 |
| CN | 206710697 U | 12/2017 |
| CN | 107690594 A | 2/2018 |
| CN | 108027548 A | 5/2018 |
| CN | 108227343 A | 6/2018 |
| CN | 208623771 U | 3/2019 |
| CN | 208956166 U | 6/2019 |

* cited by examiner

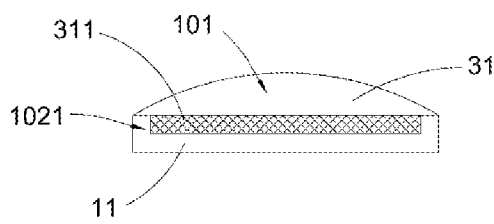 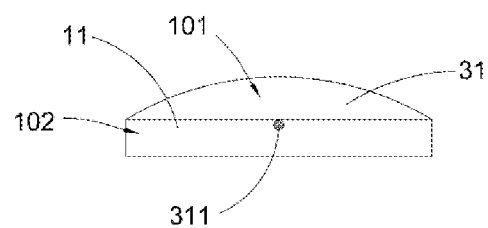
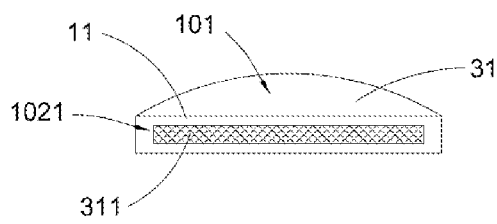 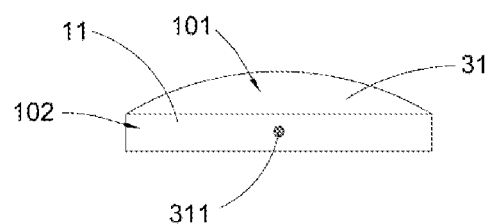
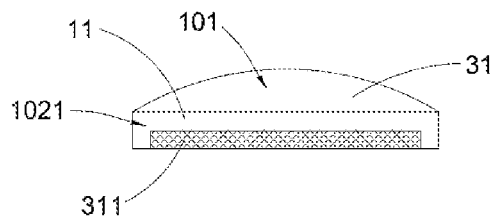 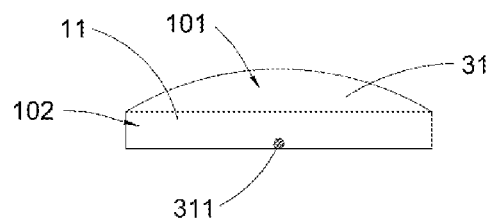
Fig. 3 Fig. 4

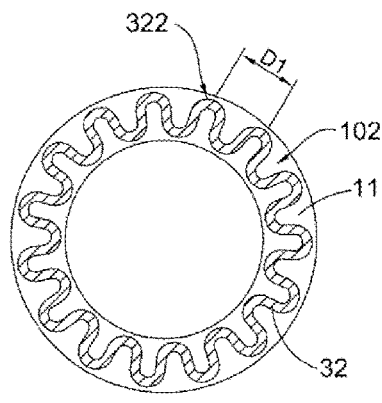
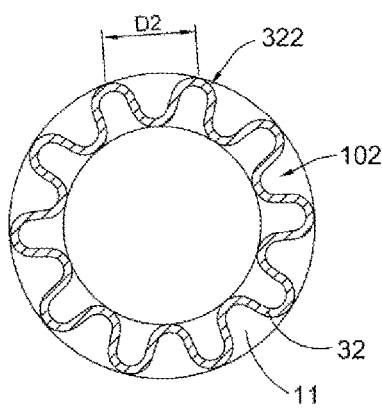
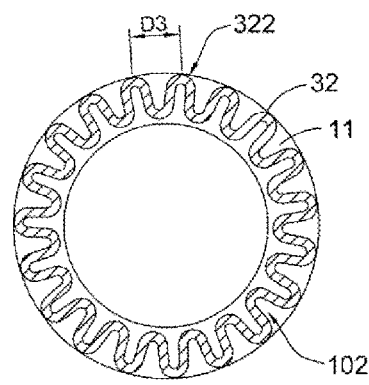
Fig. 5A    Fig. 5B    Fig. 5C
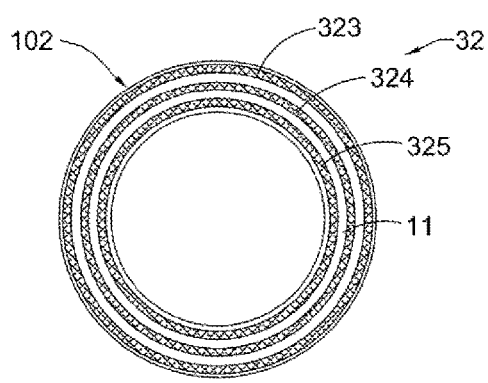
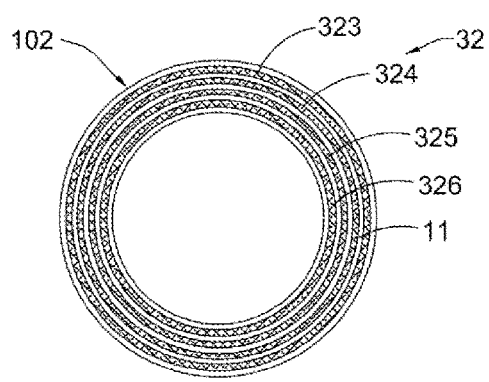
Fig. 6A    Fig. 6B

OPTICAL DEVICE AND USE THEREOF

The present application is a national stage of International Application No. PCT/CN2020/094311, filed on Jun. 4, 2020, claiming the priority of Chinese patent application No. 201910520733.0, filed on Jun. 17, 2019, and of Chinese patent application No. 201910699837.2, filed on Jul. 31, 2019, which are hereby incorporated by reference in their entireties.

TECHNICAL FIELD

The present disclosure relates to the field of optical apparatuses, and in particular to an optical device and use thereof.

BACKGROUND

An optical device concerns, for example, a lens assembly or an optical protective cover, etc. For example, the optical device is applied to a vehicle, wherein the lens assembly is embodied as a vehicle-mounted lens, a camera lens, a radar lens or a laser lens, etc., wherein the lens assembly generally comprises at least one lens element, wherein according to different materials, the lens element can be classified in a glass lens element, a resin lens element, a PC lens element or the like; and wherein the optical protective cover is embodied as, for example, a front lamp cover, a side turn lamp cover or the like of the vehicle. It is well known that, when the temperature difference between the inside and outside of the environment where the lens assembly is located is large or there are alternating cold and heat, or when in a freezing environment in winter, the inner or outer surface of the lens element of the lens assembly near the object side will produce moisture such as fog or frost, thereby affecting the transparency of the lens element, resulting in unclear imaging of the lens assembly.

In a current existing optical lens with a defogging function, the optical lens uses an electric heating wire to heat the lens element, wherein the electric heating wire is embedded in a side edge of the lens element, and wherein heating wires are connected to the positive and negative electrodes of the power supply through positive and negative conductors on both sides of the lens element, so as to realize the heat generation of the electric heating wire. The electric heating wire has pins connected to positive and negative conductors, wherein the pins of the electric heating wire are usually arranged at relatively fixed positions on a lens barrel wall or in a lens barrel cavity of the optical lens. Since the internal structure of the optical lens is relatively compact, the shape and distribution of the traditional heat generation elements are greatly limited by the structure of the vehicle-mounted lens, and during production, the access angle of the pins of the electric heating wire is limited, resulting in higher installation difficulty and a higher installation failure rate.

In addition, in the traditional optical lens defogging technology, due to the relatively fixed size of the lens element, the installation position of the heating element is limited, which limits the installation length of the heating element. As a result, the resistance value of the heating element is limited or substantially unable to be changed, so that it is impossible to adjust the heat generation power of the heating element in the case of the same voltage or current.

In addition, due to the low light transmittance of the heating element in the traditional vehicle-mounted lens, in order to ensure the optical performance of the first lens element, the heating element is installed in a peripheral region (i.e., non-clear region) of the first lens element directly in a contact manner, and the heating element cannot be arranged in a clear region (i.e., central region) of the first lens element. Especially for a large-sized first lens element, since the heating element can only directly heat the non-clear region of the first lens element, the heat diffuses from the non-clear region (i.e., peripheral region) to the clear region (i.e., central region), that is, the clear region of the first lens element cannot be directly heated, or the central clear region cannot be completely heated, resulting in the uneven heating of the first lens element, which not only has poor defogging and defrosting effects, but also easily causes the optical axis of the vehicle-mounted lens to deviate from the geometric center axis, thereby seriously affecting the eccentricity index and image quality of the vehicle-mounted lens.

With the development of science and technology, optical devices such as vehicle-mounted lenses, optical lenses, and optical lampshades are increasingly used in people's daily lives. For example, in order to provide the comfort and safety of automobile driving, vehicle-mounted lenses are widely used in the front view, rear view, surround view, inner view, side view and other fields of the automobiles. At the same time, with the continuous development of automobile technology, the number and performance of vehicle-mounted lenses required in automobiles have been greatly improved, and the requirements for weather resistance of vehicle-mounted lenses have become more stringent.

When the vehicle is driving in an environment of continuous rain, frost or alternating cold and heat, the inner and outer surfaces of the lens element of the vehicle-mounted lens near the object side are prone to fog or frost, which seriously affects the optical performance of the vehicle-mounted lens and endangers people's driving safety.

In order to ensure driving safety, the current commonly used means are mainly to install heating elements inside the vehicle-mounted lenses to heat and evaporate the moisture attached to the lens element surface or prevent fogging or frosting. However, the heating element inside the existing vehicle-mounted lens is mainly bonded by soldering for conductor connection, and the area of the welding point of the heating element is relatively large. As a result, when the heating element is powered-on to heat the lens element, the resistance at the welding point position is different from the resistance at other positions of the heating element, so that the heating element unevenly generates heat as a whole, which leads to uneven heating of the lens element and affects the optical performance of the vehicle-mounted lens.

In general, heating elements usually use heating wires. Due to the extremely small line width of the conductors, the welding area between the conductors and the heating wires is very small in the manufacturing process of the vehicle-mounted lens. Thus, it is more difficult to weld between the conductors and the heating wires, the yield is lower, and the cost is relatively higher.

SUMMARY

According to a first configuration form of the present application, one of the main advantages of the present disclosure is to provide an optical device and use thereof, wherein at least one lens element of the optical device can be heated up to accelerate the dissipation of moisture attached to the surface of the lens element while preventing fogging or frosting on the surface of the lens element.

Another advantage of the present disclosure is to provide an optical device and use thereof, wherein the lens element in the optical device is heated uniformly, and the optical axis of the lens element is not prone to deviate from the geometric center axis, thereby ensuring the performance index and imaging quality of the optical device.

Another advantage of the present disclosure is to provide an optical device and use thereof, wherein the manner in which the shape of the component heating the lens element is arranged is less limited by the optical device's own structure, thereby meeting defogging requirements of different structural types of optical devices.

Another advantage of the present disclosure is to provide an optical device and use thereof, wherein the non-clear region and the clear region of the lens element can be set with different types of heating manners, so that the lens element can be heated uniformly, thereby ensuring the performance index of the optical device.

Another advantage of the present disclosure is to provide an optical device and use thereof, wherein the component heating the lens element can meet the access of the leads (or conductors) at any angle, thereby reducing the installation difficulty.

Another advantage of the present disclosure is to provide an optical device and use thereof, wherein the leads can be connected symmetrically or asymmetrically so as to achieve uniform heating.

Another advantage of the present disclosure is to provide an optical device and use thereof, which can adjust the heat generation power in the case of the same voltage or current.

Another advantage of the present disclosure is to provide an optical device and use thereof, wherein compared with traditional defogging manner, the optical device requires less power consumption and lower cost.

Another advantage of the present disclosure is to provide an optical device and use thereof, wherein the clear region of the lens element can be heated in a direct contact manner, especially for larger-sized lens elements, the clear region of the lens element can substantially be completely heated, so as to meet the effect of defogging in the clear region or accelerating the dissipation of moisture while preventing fogging or frosting.

Another advantage of the present disclosure is to provide an optical device and use thereof, which have a simple structure, and a good defogging effect.

Other advantages and features of the present disclosure are fully embodied by the following detailed description and can be realized by the combination of means and devices specifically pointed out in the appended claims.

In the first configuration form of the present application, according to one aspect of the present disclosure, an optical device of the present disclosure that can achieve the foregoing objectives and other objectives and advantages comprises:

at least one lens element;
a lens barrel, wherein the lens barrel has an installation cavity, wherein the lens element is installed in the installation cavity of the lens barrel; and
at least one heating element, wherein the heating element is arranged to contact a surface of the lens element near an object side in a manner capable of being powered-on to generate heat, so as to heat the lens element, and wherein pins of the heating element are arranged in a non-clear region of the lens element.

In some embodiments, the heating element comprises a first heating element and at least two first pins electrically connected to the first heating element, wherein the first heating element has a light transmittance property, wherein the first heating element is arranged in a clear region of the lens element, and wherein the at least two first pins are separated from each other and disposed in a non-clear region of the lens element.

In some embodiments, the two first pins are disposed on two sides of the non-clear region of the lens element so that the heating element uniformly generates heat.

In some embodiments, each of the first pins is implemented as an arc-shaped structure, a dot-like structure, or a combination of the arc-shaped structure and the dot-like structure.

In some embodiments, a position where each of the first pins is disposed in the non-clear region of the lens element is one selected from a group consisting of an upper position, a middle position, and a lower position.

In some embodiments, the first heating element is further arranged in the non-clear region of the lens element.

In some embodiments, the first heating element is arranged on one selected from a group consisting of an inner surface, an outer surface, and the inner surface and the outer surface, in the clear region of the lens element.

In some embodiments, the first heating element is implemented as an ITO film.

In some embodiments, the optical device further comprises at least one second heating element, wherein the second heating element is arranged in a non-clear region of the lens element.

In some embodiments, the second heating element is covered on a part or all of the non-clear region.

In some embodiments, the second heating element has at least one second pin, wherein the second pins are arranged on two sides of the second heating element.

In some embodiments, the second heating element has a plurality of ring rows of protrusions, wherein the number of the protrusions is preset according to a resistance value of the second heating element.

In some embodiments, the second heating element is implemented as a multi-ring structure formed by connecting a plurality of heating elements in parallel.

In some embodiments, the multi-ring structure is one selected from a group consisting of two rings, three rings, four rings and five rings.

In some embodiments, the second heating element is implemented as a multi-ring structure formed by a plurality of heating elements connected in series.

In some embodiments, the multi-ring structure is one selected from a group consisting of three rings, five rings and seven rings.

In some embodiments, the second heating element is implemented as a unidirectionally extending arc-shaped structure, wherein two ends of the second heating element each has a second pin.

In some embodiments, the second heating element comprises a wide heating element and a narrow heating element, wherein two ends of the wide heating element are connected to two ends of the narrow heating element to form a ring-shaped structure attached to the non-clear region, and wherein two ends of the wide heating element each has a second pin.

In some embodiments, a position where the second heating element is arranged in the non-clear region of the lens element is a combination of one or more selected from a group consisting of a side surface, a peripheral region of an inner surface, and a peripheral region of an outer surface.

In some embodiments, the second heating element is implemented as an electric heating wire.

In the first configuration form of the present application, according to another aspect of the present disclosure, the present disclosure further provides a method for manufacturing an optical device, comprising the following steps:

A. providing a lens barrel and at least one lens element, wherein the lens element is installed in an installation cavity of the lens barrel; and B. arranging at least one heating element on a surface of the lens element near an object side in a manner capable of being powered-on to generate heat, so as to heat the lens element, wherein pins of the heating element are arranged in a non-clear region of the lens element.

In some embodiments, the step B comprises step B1: arranging at least one first heating element in a clear region of the lens element, and arranging at least two first pins in the non-clear region of the lens element in a manner of being separated from each other, wherein the first pins are electrically connected to the first heating element.

In some embodiments, the method further comprises step C: extending at least two leads from the first pins to a power supply unit, respectively.

In some embodiments, the step B comprises step B2: arranging at least one second heating element in the non-clear region of the lens element.

In some embodiments, the first heating element is implemented as an ITO film.

In some embodiments, in the step C, a shape of the second heating element is preset according to a resistance value of the second heating element.

According to a second configuration form of the present application, another structure and arrangement are (additionally or alternatively) adopted, especially for the heating element. Therefore, one of the main advantages of the present disclosure is to provide an optical device and use thereof, which can avoid the problem of uneven heat generation of the heating element caused by the connection between the heating element and the conductors due to welding or other manners, so that the heating element can uniformly heat the lens element of the optical device, namely, accelerating the dissipation of moisture attached to the surface of the lens element or preventing fogging or frosting on the surface of the lens element, and can ensure the optical performance of the optical device.

Another advantage of the present disclosure is to provide an optical device and use thereof, wherein the conductors are indirectly conductively connected to the positive and negative terminals of the heating element on the outside of the lens element, so that the heat generation temperature of the heating element is uniformly distributed, or in other words, the heat generation temperature at the terminal position of the heating element is kept uniform with the heat generation temperature at other positions, so that the lens element is uniformly heated.

Another advantage of the present disclosure is to provide an optical device and use thereof, which can realize simple assembly, reduce the difficulty of connecting conductor ends, and reduce manufacturing costs.

Another advantage of the present disclosure is to provide an optical device and use thereof, wherein the area of contact and electrical connection between the heating element and the conductive element can be preset according to actual needs, thereby avoiding the problem of greater difficulty in welding due to the very small welding area between the conductor and the heating wire, and thus improving the yield of the product.

Another advantage of the present disclosure is to provide an optical device and use thereof, which can ensure the stability of the electrical circuit, and prevent loosening during heating or moving of the optical device and affecting the heat generation efficiency of the heating element.

Another advantage of the present disclosure is to provide an optical device and use thereof, which can realize that the positive and negative terminals of the heating element can be indirectly conductively connected to the conductors on the side wall or bottom wall of the lens element, thereby providing a variety of feasible manufacturing schemes to achieve diversification.

Another advantage of the present disclosure is to provide an optical device and use thereof, which can improve heat generation efficiency and reduce heat loss.

Another advantage of the present disclosure is to provide an optical device and use thereof, which can realize the arrangement of the conductors in a plastic module by means of injection of conductive paste, without additional conductors being assembled, so that the assembly of the optical device is simple, the appearance is optimized, and the optical performance is not affected.

Another advantage of the present disclosure is to provide an optical device and use thereof, which can realize multi-angle or multi-position access of conductors, has a wide application, and reduces the difficulty of manufacturing the optical device.

Another advantage of the present disclosure is to provide an optical device and use thereof, which have a simple structure, simple process and low cost.

Other advantages and features of the present disclosure are fully embodied by the following detailed description and can be realized by the combination of means and devices specifically pointed out in the appended claims.

In the second configuration form of the present application, according to one aspect of the present disclosure, an optical device of the present disclosure that can achieve the foregoing objectives and other objectives and advantages comprises:

at least one lens element;

a lens barrel, wherein the lens element is installed on the lens barrel;

at least one heating element; and at least two conductive elements, wherein the heating element is disposed on the lens element, wherein the heating element has at least two terminals, wherein the at least two conductive elements are fixed to positions in contact and electrical connection with corresponding terminals, respectively, wherein the conductive elements each have a conductive contact surface, wherein the conductive contact surface is electrically connected to the terminals of the heating element in a surface contact manner, and wherein the at least two conductive elements are used to access a power supply device so that the power supply device supplies electric power to the heating element to heat the lens element.

In some embodiments, the area of the conductive contact surface is greater than or equal to the area of the terminal.

In some embodiments, further comprising at least two conductors, wherein the at least two conductors are electrically connected to corresponding conductive elements, respectively, so that the conductive elements access the power supply device through the conductors.

In some embodiments, the conductive elements are bonded and fixed at positions in contact and electrical connection with the corresponding terminals.

In some embodiments, the optical device further comprises a conductive adhesive, and wherein the conductive contact surface of the conductive elements is bonded and fixed to a position in electrical contact with the terminals of the heating element through the conductive adhesive.

In some embodiments, the conductive adhesive is dispensed between the conductive contact surface of the conductive elements and the lens element, and is in electrical contact with the terminals of the heating element.

In some embodiments, the optical device further comprises at least one fixing element, and wherein the conductive elements are fixed and held by the fixing element at positions in contact and electrical connection with the terminals of the heating element.

In some embodiments, the lens barrel has at least one fixed cavity and at least one conductor channel, wherein the fixed cavity is located between the lens element and a barrel wall of the lens barrel, wherein the conductive elements are installed in the fixed cavity and is in electrical contact with the terminals of the heating element, wherein the fixing element is installed between the conductive elements and the barrel wall and provides a force so that the conductive elements and the lens element are kept relatively fixed, and wherein the conductor channel communicates with the fixed cavity and extends outward along the barrel wall, so that the conductors extend outward from the conductive elements along the conductor channel.

In some embodiments, the terminals of the heating element are arranged in a peripheral region of an inner surface of the lens element, and wherein the fixing element provides a force so that the conductive elements are fixed and held on the peripheral region of the inner surface of the lens element and is in electrical contact with the terminals.

In some embodiments, the terminals of the heating element are arranged on a side surface of the lens element, wherein the fixing element provides a force so that the conductive elements are fixed to the barrel wall, and wherein the conductive elements are extended to the side surface of the lens element and are in electrical contact with the terminals.

In some embodiments, the conductive element comprises a first conductive element and a second conductive element, wherein the fixing element fixes the first conductive element and the second conductive element to the barrel wall, and wherein the first conductive element is extended to the side surface of the lens element and is in electrical contact with the terminals.

In some embodiments, the first conductive element and the second conductive element are bonded and connected by a conductive adhesive.

In some embodiments, the first conductive element and the second conductive element are implemented as the same or different conductive materials.

In some embodiments, the fixing element is implemented as an elastic element.

In some embodiments, the optical device further comprises a thermal insulating member, and wherein the thermal insulating member is disposed on the lens element in a manner to reduce heat dissipation from the heating element.

In some embodiments, the thermal insulating member is installed between the lens element and a wall of the lens barrel, and provides a force so that the conductive elements and the lens element are kept relatively fixed, and wherein the thermal insulating member is electrically insulated and thermal insulating.

In some embodiments, the fixing element is disposed between the conductive elements and the thermal insulating member in a manner to enhance a connection effect.

In some embodiments, a contacting surface between the conductive element and the terminal of the heating element is preset according to a shape and position of the terminals of the heating element.

In some embodiments, each of the conductive elements is implemented as a dot-like structure.

In some embodiments, the two terminals are located on two sides of the lens element, and wherein one of the conductive elements is fixed and held at a position in electrical contact and connection with one of the terminals, and the other conductive element is fixed and held at a position in electrical contact and connection with the other terminal.

In some embodiments, the two terminals are located on the same side of the lens element without contacting each other, wherein one of the conductive elements is fixed and held at a position in electrical contact and connection with one of the terminals, and the other conductive element is fixed and held at a position in electrical contact and connection with the other terminal, and wherein the two conductive elements are not in contact with each other.

In some embodiments, the two conductive elements are implemented as arc-shaped structures and do not contact each other, wherein one of the conductive elements extends along one side of the periphery of the lens element and is in electrical contact and connection with one of the terminals of the heating element, the other conductive element extends along the other side of the periphery of the lens element and is in electrical contact and connection with the other terminal of the heating element.

In some embodiments, one of the conductive elements is implemented as a dot-like structure, and the other conductive element is implemented as an arc-shaped structure.

In some embodiments, each of the terminals of the heating element is reserved to be in electrical contact and connection with a corresponding conductive element, and the remaining part of the heating element is insulated.

In some embodiments, the lens barrel has a barrel wall, wherein the barrel wall is made of non-conductive material, wherein the barrel wall has at least two conductor channels that do not communicate with each other, wherein the at least two conductor channels are extended to corresponding terminals of the heating element, respectively, and wherein the at least two conductive elements are cured and molded by injecting conductive paste into the at least two conductor channels, respectively, so that the at least two conductive elements are electrically connected to the corresponding terminals, respectively.

In some embodiments, the terminals of the heating element are located on a side surface of the lens element, wherein the conductor channels are extended to the side surface of the lens element, and wherein the conductive contact surface of the conductive elements is electrically connected to the terminals at positions on the side surface of the lens element.

In some embodiments, the terminals of the heating element are located in a peripheral region of an inner surface of the lens element, wherein the conductor channels are extended to the peripheral region of the inner surface of the lens element, and wherein the conductive contact surface is electrically connected to the terminals at positions on the peripheral region of the inner surface of the lens element.

In the second configuration form of the present application, according to another aspect of the present disclosure, the present disclosure further provides a method for manufacturing an optical device, comprising the following steps:

A. arranging at least one heating element on at least one lens element, wherein the heating element has two terminals;

B. installing the lens element in a lens barrel; and

C. fixing and holding at least two conductive elements at positions in electrical contact with corresponding terminals of the heating element, respectively, wherein the conductive elements each have a conductive contact surface, wherein the conductive contact surface is electrically connected to the terminals of the heating element in a surface contact manner, and wherein the at least two conductive elements are used to be connected to a power supply device so that the power supply device supplies electric power to the heating element to heat the lens element, and wherein step A and step B can be interchanged.

In some embodiments, in the step C, the conductive elements are bonded and fixed at positions in electrical contact with the terminals of the heating element through a conductive adhesive.

In some embodiments, the conductive adhesive is dispensed between the conductive contact surface of the conductive elements and the lens element, and is in electrical contact with the terminals of the heating element.

In some embodiments, in the step C, the conductive elements are fixed and held at positions in electrical contact with the terminals through at least one fixing element.

In some embodiments, in the step C, the terminals of the heating element are arranged in a peripheral region of an inner surface of the lens element, and wherein the fixing element provides a force so that the conductive elements are fixed and held on the peripheral region of the inner surface of the lens element and are in electrical contact with the terminals.

In some embodiments, in the step C, the terminals of the heating element are arranged on a side surface of the lens element, wherein the fixing element provides a force so that the conductive elements are fixed to a barrel wall of the lens barrel, and wherein the conductive elements are extended to the side surface of the lens element and are in electrical contact with the terminals.

In some embodiments, the step C further comprises a step of: bonding and fixing the conductive elements at positions in electrical contact with the terminals of the heating element through a conductive adhesive.

In some embodiments, the method further comprises a step of: disposing a thermal insulating member on the lens element in a manner to reduce heat dissipation from the heating element.

In some embodiments, the thermal insulating member is installed between the lens element and a wall of the lens barrel, and provides a force so that the conductive elements and the lens element are kept relatively fixed, and wherein the thermal insulating member is electrically insulated and thermal insulating.

In some embodiments, a contacting surface between the conductive element and the terminal of the heating element is preset according to a shape and position of the terminals of the heating element.

In some embodiments, each of the terminals of the heating element is reserved to be in electrical contact and connection with a corresponding conductive element, and the remaining part of the heating element is insulated.

In some embodiments, in the step C, the lens barrel has a barrel wall, wherein the barrel wall is made of non-conductive material, wherein the barrel wall has at least two conductor channels that do not communicate with each other, and wherein the at least two conductive elements are cured and molded by injecting conductive paste into the at least two conductor channels, respectively.

Further objectives and advantages of the present disclosure will be fully embodied through the understanding of the following description and the drawings.

These and other objectives, features and advantages of the present disclosure are fully embodied by the following detailed description, drawings and claims.

BRIEF DESCRIPTION OF THE DRAWINGS

FIG. 3 is a schematic plan view of a first pin of a first heating element of the optical device according to the above preferred embodiment of the present disclosure, which is implemented as an arc-shaped structure.

FIG. 4 is a schematic plan view of a first pin of the first heating element of the optical device according to the above preferred embodiment of the present disclosure, which is implemented as a dot-like structure.

FIG. 5A is a schematic plan view of a normal distance D1 between adjacent protrusions of a second heating element of the optical device according to the above-mentioned preferred embodiment of the present disclosure.

FIG. 5B is a schematic plan view of a relatively large distance D2 between adjacent protrusions of the second heating element of the optical device according to the above-mentioned preferred embodiment of the present disclosure.

FIG. 5C is a schematic plan view of a relatively small distance D3 between adjacent protrusions of the second heating element of the optical device according to the above-mentioned preferred embodiment of the present disclosure.

FIG. 6A is a schematic plan view of the second heating element of the optical device according to the above preferred embodiment of the present disclosure, which is implemented as a three-ring structure formed by connecting three electric heating wires in parallel.

FIG. 6B is a schematic plan view of the second heating element of the optical device according to the above-mentioned preferred embodiment of the present disclosure, which is implemented as a four-ring structure formed by connecting four electric heating wires in parallel.

DETAILED DESCRIPTION

Figure 1:
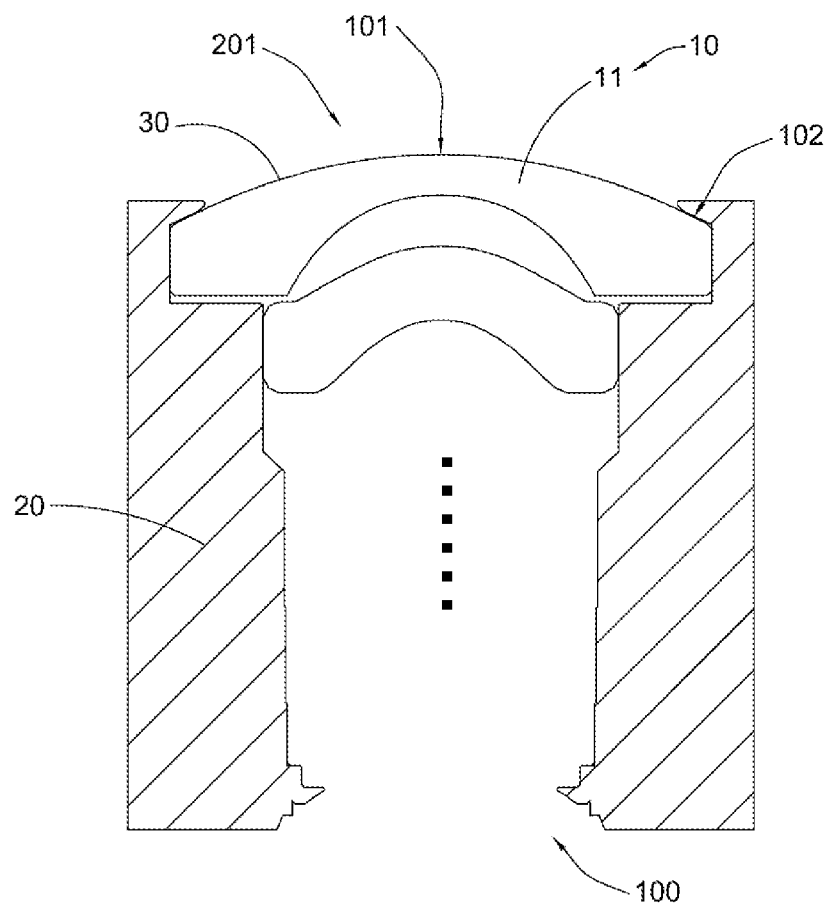
FIG. 1 is a schematic plan view of an optical device according to a preferred embodiment of the present disclosure in a first configuration form of the present application.

The following description is presented to disclose the present application to enable those skilled in the art to practice the present disclosure. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present application.

It should be understood by those skilled in the art that in the disclosure of the present application, the orientation or positional relationship indicated by the terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present disclosure and simplifying the description, and does not indicate or imply that the mentioned apparatus or element must have a particular orientation and be constructed and operated in the particular orientation. Therefore, the above terms cannot be construed as limiting the present application.

It may be understood that the term "a" or "an" should be understood to mean "at least one" or "one or more", that is, in one embodiment, the number of an element may be one, and in other embodiments, the number of the element may be multiple. The term "a" or "an" cannot be understood as a limitation on the number.

It should be understood that, within the scope of the present application, the disclosed different configuration forms and/or embodiments and/or technical features may also be combined arbitrarily, as long as they do not constitute a technical conflict, and there is no contradiction in implementation.

In the following description, for different configuration forms and/or different embodiments, the same or corresponding components use the same name, terms and reference signs.

An optical device 100 according to a preferred embodiment of the present disclosure in a first configuration form of the present application is as shown in FIGS. 1 to 10, wherein the optical device 100 is preferably implemented as a vehicle-mounted lens or module for a vehicle. The optical device 100 comprises at least one lens element 10, a lens barrel 20, and at least one heating element 30, wherein the lens barrel 20 has a installation cavity 201, wherein the lens element 10 is installed on the installation cavity 201 of the lens barrel 20, wherein the lens element 10 has a clear region 101 and a non-clear region 102, and wherein the heating element 30 is arranged in the clear region 101 and the non-clear region 102 of the lens element 10 for generating heat, so that the clear region 101 and the non-clear region 102 of the lens element 10 can each be directly heated, thereby achieving defogging or accelerating the dissipation of moisture attached to the surface of the lens element 10, and ensuring the optical performance of the optical device.

Preferably, pins (a first pin 311 and a second pin 321) of the heating element 30 are each arranged in the non-clear region 102 of the lens element 10 near an object side, wherein the pins of the heating element 30 are preferably two separated from each other, wherein the pins of the heating element 30 are used to be connected to a power supply unit such as an electrical source through positive and negative conductors (leads). In a manufacturing process, the heating element 30 and the pins of the heating element 30 can be prearranged on the lens element 10, and then the lens element 10 with the heating element 30 and its pins can be installed on/in the lens barrel 20. Moreover, the pins of the heating element 30 can be arbitrarily disposed at any position of the non-clear region 102 of the lens element 10, and the pins of the heating element 30 can have a certain area to achieve the access of the leads at any angle, thereby reducing the installation difficulty and improving the yield.

As shown in FIG. 1, it can be understood that the lens element 10 comprises a first lens element 11 located on the object side (outermost side) of the lens barrel 20, wherein the first lens element 11 is axially installed in the lens barrel 20, wherein the first lens element 11 is substantially implemented as a convex-concave structure from an outer surface to an inner surface, or may also be implemented as a concave-convex structure, a biconcave structure, a biconvex structure or the like from the outer surface to the inner surface, which is not limited here, and wherein the periphery of the first lens element 11 is embedded and installed on an inner wall of the installation cavity 201 of the lens barrel 20. It can be seen that a peripheral part of the first lens element 11 is in contact with the lens barrel 20 to form the non-clear region 102, wherein upper and lower surfaces of the first lens element 11 are not in contact with the lens barrel 20 to form the clear region 101.

In this embodiment, the optical device 100 is installed in a vehicle. During the driving of the vehicle, affected by an external environment such as a high temperature environment, a low temperature environment or rain and snow environment, the inner surface or outer surface of the first lens element 11 on the object side of the optical device 100 is most prone to condense moisture or form fog or frost. The heating element 30 is arranged on the first lens element 11, wherein the heating element 30 is used to generate heat, to heat the first lens element 11, so as to accelerate the dissipation of moisture or fog or frost attached to the inner or outer surface of the first lens element 11, having an active defogging and defrosting function, or preventing the formation of fog or frost on the inner or outer surface of the first lens element 11, thereby ensuring the optical performance of the optical device 100.

Optionally, the optical device 100 may be implemented as an optical protective cover, wherein the optical protective cover has a light-transmitting cover, wherein the light-transmitting cover may be made of plastic material, glass material or crystal material, etc., and wherein the heating element 30 is arranged on the light-transmitting cover to accelerate the dissipation of moisture or fog or frost attached to the inner or outer surface of the light-transmitting cover, thereby having an active defogging and defrosting function, or preventing the formation of fog or frost on the inner or outer surface of the light-transmitting cover. In this embodiment, the arrangement manner in which the heating element 30 is arranged on the light-transmitting cover can be replaced with an arrangement manner in which the heating element 30 is arranged on the lens element 10, which is not limited here.

Further, the heating element 30 comprises at least one first heating element 31, wherein the first heating element 31 is arranged in the clear region 101 of the first lens element 11 for heating the clear region 101 of the first lens element 11 in a direct contact manner, so as to accelerate the dissipation of moisture on the surface of the clear region 101 or prevent fogging.

Preferably, the first heating element 31 is implemented as an ITO film, wherein the clear region 101 of the first lens element 11 is selected to be plated on the surface of the first heating element 31 by a method such as sputtering or evaporation. The first heating element 31 has at least two first pins 311, wherein the first pins 311 are disposed in the non-clear region 102 of the first lens element 11, wherein the first pins 311 are electrically connected to a power supply unit by a lead (or conductor), wherein the power supply unit supplies electric power to the first heating element 31, and wherein the first heating element 31 converts electrical energy into heat energy and heats the clear region 101 of the first lens element 11 in a direct contact manner. It can be understood that the first heating element 31 has a high light transmittance property, wherein the first pins 311 of the first heating element 31 avoid the clear region 101, thereby ensuring the optical performance of the clear region 101 of the first lens element 11. Especially for a first lens element 11 with a relatively large size, the clear region 101 of the first lens element 11 can also be fully or completely heated, so as to meet the effect of defogging or accelerating the dissipation of moisture for the clear region 101.

It can be understood that the power supply unit may constantly supply power to the first heating element 31, so that the first heating element 31 can continuously and stably generate a certain temperature to continuously heat the first lens element, and the first lens element 11 is always maintained at a certain temperature. Thus, fogging or frosting on the surface of the first lens element can be prevented.

That is, the first heating element 31 extends from the clear region 101 to the non-clear region 102, and the first pins 311 are formed in the non-clear region 102 to facilitate installation, ensuring structural rationality.

Optionally, the first heating element 31 is further arranged in the non-clear region 102 of the first lens element 11 so as to simultaneously heat the clear region 101 and the non-clear region 102 of the first lens element 11. Optionally, the first heating element 31 may only be arranged in a part or all of the clear region 101, and heat can be diffused to all of the clear region 101 and to the non-clear region 102, so that both may achieve the effect of accelerating the dissipation of moisture attached to the surface or preventing fogging, which is not limited here.

Further, the heating element 30 further comprises at least one second heating element 32, wherein the second heating element 32 is arranged in the non-clear region 102 of the first lens element 11 for heating the non-clear region 102 of the first lens element 11 in a direct contact or thermal radiation manner, so that the non-clear region 102 of the first lens element 11 is heated up in a direct contact or thermal radiation manner, and the heat can be diffused to the clear region 101, thereby achieving the effect of accelerating the dissipation of moisture attached to the surface or preventing surface fogging.

Preferably, the second heating element 32 is implemented as an electric heating wire, such as silver wire, copper wire, iron-chromium wire, chromium-nickel and other metal or alloy materials, wherein the electric heating wire material may also be a conductive adhesive, conductive silver paste, conductive carbon paste or the like. The second heating element 32 is arranged on a surface of the non-clear region 102 of the first lens element 11 by selecting and using a method such as silk screen printing or glue dispensing. The second heating element 32 has at least one second pin 321, wherein the second pin 321 is connected to a power supply unit by a lead (or conductor), wherein the power supply unit supplies electric power to the second heating element 32, and wherein the second heating element 32 converts the power into heat and transfers it to the non-clear region 102 of the first lens element 11 in a direct contact or thermal radiation manner, so that the first lens element 11 is heated up.

Correspondingly, the power supply unit may constantly supply power to the second heating element 32, so that the second heating element 32 can continuously and stably generate a certain temperature to continuously heat the first lens element 11, and the first lens element 11 is always maintained at a certain temperature. Thus, fogging or frosting on the surface of the first lens element can be prevented. Optionally, the first heating element 31 and the second heating element 32 can be simultaneously connected to the same power supply unit to achieve simultaneous control. Specifically, the first heating element 31 and the second heating element 32 may share two pins, wherein the two pins are connected to the same power supply unit through conductors. Alternatively, the first heating element 31 and the second heating element 32 are connected to different power supply units to achieve separate control, respectively. Specifically, the first heating element 31 and the second heating element 32 may each have two pins (two first pins 311 and two second pins 321), wherein two first pins 311 and two second pins 321 are connected to two different power supply units through conductors, respectively.

It is worth mentioning that the second heating element 32 is not arranged in the clear region 101 of the first lens element 11, in order to prevent the optical performance of the first lens element 11 from being affected.

Compared with the traditional defogging method, the heating element 30 of the optical device 100 can be directly arranged on the surface of the clear region 101 or the non-clear region 102 of the first lens element 11. Therefore, the process of defogging or accelerating the dissipation of moisture requires less power consumption and lower cost.

Figure 2A:
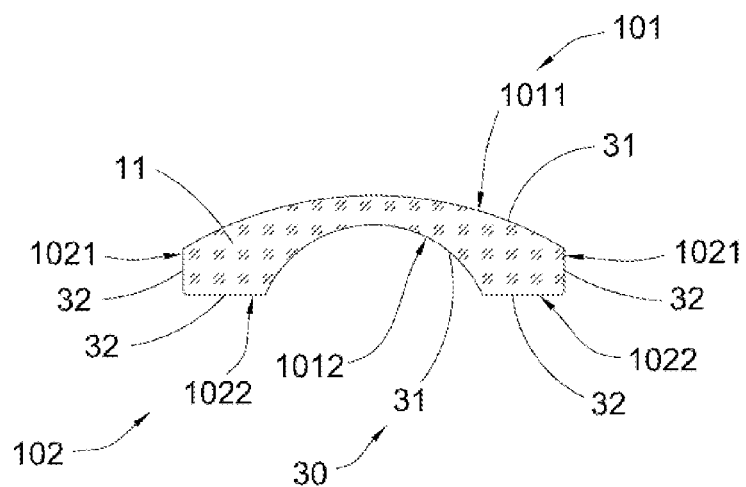
FIG. 2A is a schematic structural view of a first lens element of the optical device according to the above-mentioned preferred embodiment of the present disclosure, which has a convex-concave structure from an outer surface to an inner surface.

As shown in FIG. 2A, further, the clear region 101 of the first lens element 11 comprises an outer clear region 1011 and an inner clear region 1012, wherein the outer clear region 1011 is located on an outer surface (such as a convex circular surface) of the clear region 101 of the first lens element 11, and wherein the inner clear region 1012 is located on an inner surface (such as a convex circular surface) of the clear region 101 of the first lens element 11. The non-clear region 102 of the first lens element 11 comprises a side non-clear region 1021 and a bottom non-clear region 1022, wherein the side non-clear region 1021 is located on a side surface (such as a circular ring side surface) of the non-clear region 102 the first lens element 11, and wherein the bottom non-clear region 1022 is located on a peripheral bottom surface (such as a circular ring bottom surface) of the inner surface of the non-clear region 102 of the first lens element 11.

Figure 2B:
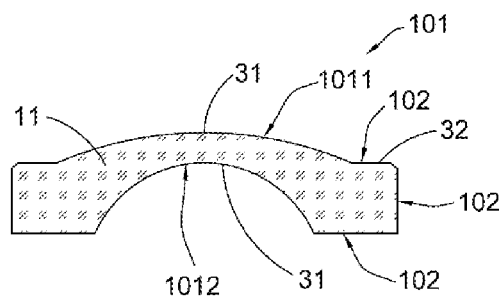
FIG. 2B is a schematic structural view of another implementation of the first lens element of the optical device according to the above-mentioned preferred embodiment of the present disclosure, which has the convex-concave structure from the outer surface to the inner surface.
Figure 2C:
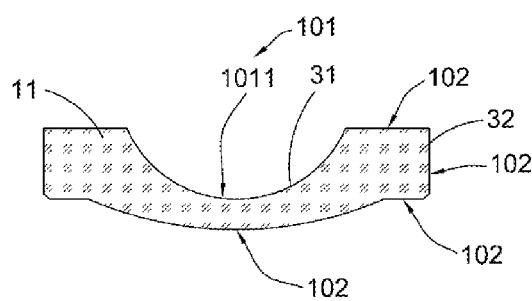
FIG. 2C is a schematic structural view of the first lens element of the optical device according to the above-mentioned preferred embodiment of the present disclosure, which has a concave-convex structure from the outer surface to the inner surface.
Figure 2D:
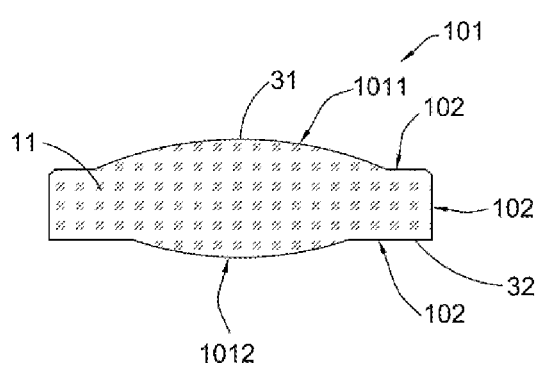
FIG. 2D is a schematic structural view of the first lens element of the optical device according to the above-mentioned preferred embodiment of the present disclosure, which has a biconvex structure from the outer surface to the inner surface.
Figure 2E:
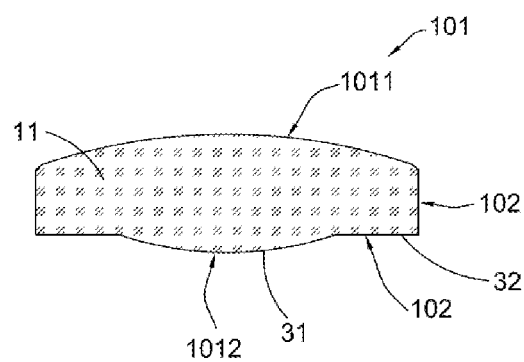
FIG. 2E is a schematic structural view of another implementation of the first lens element of the optical device according to the above-mentioned preferred embodiment of the present disclosure, which has the biconvex structure from the outer surface to the inner surface.
Figure 2F:
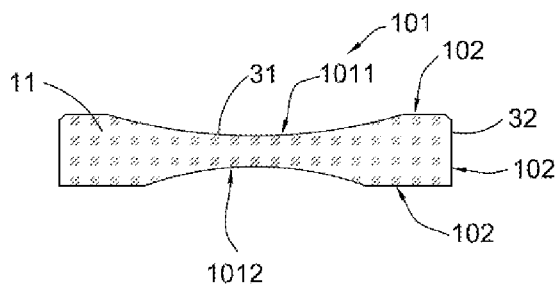
FIG. 2F is a schematic structural view of the first lens element of the optical device according to the above-mentioned preferred embodiment of the present disclosure, which has a biconcave structure from the outer surface to the inner surface.

Optionally, as shown in FIG. 2B, the first lens element 11 is implemented as a convex-concave structure from the outer surface to the inner surface. Optionally, as shown in FIG. 2C, the first lens element 11 is implemented as a concave-convex structure from the outer surface to the inner surface. Optionally, as shown in FIGS. 2D and 2E, the first lens element 11 is implemented as a biconvex structure from the outer surface to the inner surface. Optionally, as shown in FIG. 2F, the first lens element 11 is implemented as a biconcave structure from the outer surface to the inner surface. As shown in FIGS. 2B, 2C, 2D and 2F, the outer clear region 1011 of the first lens element 11 is located in the middle of the outer surface of the first lens element 11, wherein the periphery of the outer surface of the first lens element 11 is supported against a wall of the lens barrel 20 and forms the non-clear region 102, or the periphery of the outer surface of the first lens element 11 can be fixed by at least one fixing element so as to form the non-clear region 102, wherein the fixing element is, for example, a pressing ring, or the periphery of the outer surface of the first lens element 11 may also be fixed by the pressing ring, or the periphery of the outer surface of the first lens element 11 is fixed by an inner pressing ring, wherein the inner pressing ring is threaded on the inner wall of the lens barrel 20, and wherein the periphery of the outer surface of the first lens element 11 is supported against the inner pressing ring so that the periphery of the outer surface of the first lens element 11 represents the non-clear region 102. Alternatively, the periphery of the outer surface of the first lens element 11 is fixed by an outer pressing ring, wherein the outer pressing ring is threaded on the outer wall of the lens barrel 20, and wherein the periphery of the outer surface of the first lens element 11 is supported against the outer pressing ring, so that the periphery of the outer surface of the first lens element 11 represents the non-clear region 102. Alternatively, the periphery of the inner surface of the first lens element 11 is supported against the wall of the lens barrel 20, or the periphery of the inner surface of the first lens element 11 is supported against a spacing member such as a spacer ring or a washer, or the periphery of the inner surface of the first lens element 11 is directly supported against the peripheral region of the adjacent lens element located inside the first lens element 11, thereby forming the non-clear region 102, which is not limited here.

In other words, the non-clear region 102 comprises a peripheral region located on the outer surface of the first lens element 11, a region located on the side surface of the first lens element 11 and a peripheral bottom surface located on the inner surface of the first lens element 11. It can be understood that the second heating element 32 or the pins (the first pins 311 or the second pins 321) may be arranged at positions in the non-clear region 102, which are one or more positions selected from the peripheral region located on the outer surface of the first lens element 11, the region located on the side surface of the first lens element 11 and the peripheral bottom surface located on the inner surface of the first lens element 11. As shown in FIG. 2E, the outer clear region 1011 of the first lens element 11 is located on the outer surface of the first lens element 11, wherein the non-clear region of the first lens element 11 comprises a region located on the side surface of the first lens element 11 and a peripheral bottom surface located on the inner surface of the first lens element 11. Correspondingly, the second heating element 32 or the pins (the first pins 311 or the second pins 321) may be arranged at positions in the non-clear region 102, which are one or more positions selected from the region located on the side surface of the first lens element 11 and the peripheral bottom surface located on the inner surface of the first lens element 11, which is not limited here.

It can be understood that after the first lens element 11 is installed on/in the lens barrel 20, neither the outer clear region 1011 nor the inner clear region 1012 is blocked by the lens barrel 20 for light passing. The side non-clear region 1021 and the bottom non-clear region 1022 are both blocked by the lens barrel 20 without allowing light to pass.

Preferably, the first heating element 31 is arranged in the outer clear region 1011, wherein the first heating element 31 substantially completely covers the outer clear region 1011. The first heating element 31 extends to two sides of the side non-clear region 1021 and forms two first pins 311 that are symmetrical and separated from each other. That is, the two first pins 311 are arranged on two sides of the side non-clear region 1021, respectively, and are electrically connected to the first heating element 31, meeting 180° symmetrical access of the leads, so that the first heating element 31 generates heat uniformly. Alternatively, the two first pins 311 may also be arranged asymmetrically in the non-clear region of the lens element 10, and the first heating element 31 may also generate heat uniformly, which is not limited here. It can be seen that, because the first heating element 31 substantially completely covers the first lens element 11, the first lens element 11 can be uniformly heated, namely, achieving the effect of accelerating the dissipation of moisture attached to the surface of the first lens element 11 or defogging, and ensuring that the lens element 10 in the optical device 100 is uniformly heated, and the optical axis of the lens element 10 is not prone to deviate from the geometric center axis, thereby ensuring the performance index and imaging quality of the optical device 100.

As shown in FIG. 3, further, the first pin 311 is implemented as an arc-shaped structure attached to the side non-clear region 1021, wherein the two first pins 311 are separated from each other without contact to prevent short circuit, wherein an arc length of the first pin 311 is shorter than a half circumference of the first lens element 11, and a width of the first pin 311 is smaller than a width of the side non-clear region 1021.

In this embodiment, the first heating element 31 is extended to a contact edge of upper positions of the side non-clear region 1021 and the clear region 1011. Optionally, the first heating element 31 may be extended to cover middle positions of the side non-clear region 1021. Optionally, the first heating element 31 may be extended to cover lower positions of the side non-clear region 1021.

It can be understood that the two first pins 311 have a certain arc length and width, so that the first heating element 31 substantially meets the access of the leads (or conductors) at any angle, reducing the installation difficulty.

It is worth mentioning that the position of the first pin 311 in the side non-clear region 1021 can be preset and adjusted. In other words, the first pin 311 may be preset to be located on an upper position of the side non-clear region 1021 and adjacent to the outer clear region 1011, but not adjacent to the bottom non-clear region 1022, wherein the first heating element 31 is not arranged in the side non-clear region 1021. Optionally, the first heating element 31 extends to cover the middle positions of the side non-clear region 1021, wherein the first pin 311 can be preset to be located in a middle position of the side non-clear region 1021, that is, it is not adjacent to the outer clear region 1011, nor is it adjacent to the bottom non-clear region 1022. Optionally, the first heating element 31 extends to lower positions of the side non-clear region 1021, wherein the first pin 311 may be preset to be located on a lower position of the side non-clear region 1021 and adjacent to the bottom non-clear region 1022, but not adjacent to the outer clear region 1011. Optionally, the first pin 311 may be preset to be located in the side non-clear region 1021 and have a width equal to that of the side non-clear region 1021, that is, the first pin 311 is adjacent to both the outer clear region 1011 and the bottom non-clear region 1022. It can be known by those skilled in the art that the preset position or shape and size of the first pin 311 may be adjusted arbitrarily to be suitable for the optical device 100 with different structures and shapes, meeting the access of the leads at any angle, and reducing the installation difficulty, which is not limited here.

As shown in FIG. 4, in the first modified implementation of this preferred embodiment, the first pin 311 is implemented as a dot-like structure. The two first pins 311 may each be preset to be located at any position of the side non-clear region 1021, and do not overlap each other. Further, the first pin 311 may be preset to be located at an upper position of the side non-clear region 1021 and adjacent to the outer clear region 1011, or the first pin 311 may be preset at a middle position of the side non-clear region 1021, or the first pin 311 is preset at a lower position of the side non-clear region 1021 and is adjacent to the bottom non-clear region 1022, and so on, which is not limited here.

In the second modified implementation of this embodiment, the first heating element 31 is arranged in the inner clear region 1012, wherein the first heating element 31 substantially completely covers the inner clear region 1012. The first heating element 31 extends to two sides of the bottom non-clear region 1022 and forms two first pins 311 that are symmetrical and separated from each other, that is, the two first pins 311 are arranged on two sides of the bottom non-clear region 1022, respectively, and electrically connected to the first heating element 31. It can be seen that the first heating element 31 can substantially completely cover the first lens element 11, so that the first lens element 11 can be uniformly heated, so as to achieve the effect of accelerating the dissipation of moisture attached to the surface of the first lens element 11 or defogging, and ensure that the lens element 10 in the optical device 100 is uniformly heated, and the optical axis of the lens element 10 is not prone to deviate from the geometric center axis, thereby ensuring the performance index and imaging quality of the optical device 100.

Correspondingly, the first pins 311 may be implemented as an arc-shaped structure, or may be implemented as a dot-like structure. The first heating element 31 can be extended to the contact edge of the bottom non-clear region 1022 and the inner clear region 1012, or the first heating element 31 can be extended to cover a part or all of the bottom non-clear region 1022. Correspondingly, the first pins 311 can be disposed at positions in the middle or on two sides of the bottom non-clear region 1022, or at any positions without overlapping each other, which is not limited here.

It can be understood that the first heating element 31 may only be arranged in the outer clear region 1011 of the first lens element 11. The first heating element 31 may also be arranged only in the inner clear region 1012 of the first lens element 11. The first heating element 31 may also be arranged in the outer clear region 1011 and the inner clear region 1012 of the first lens element 11 at the same time. Further, the first heating element 31 may also be selectively arranged in part or all of the side non-clear region 1021 or the bottom non-clear region 1022 of the first lens element 11, which is not limited here.

Optionally, the first pins 311 may also be implemented as a combined structure of an arc-shaped structure or a dot-like structure. For example, the first pin 311 on one side is a dot-like structure, and the first pin 311 on the other side is an arc-shaped structure, and so on, which is not limited here.

Figure 10:
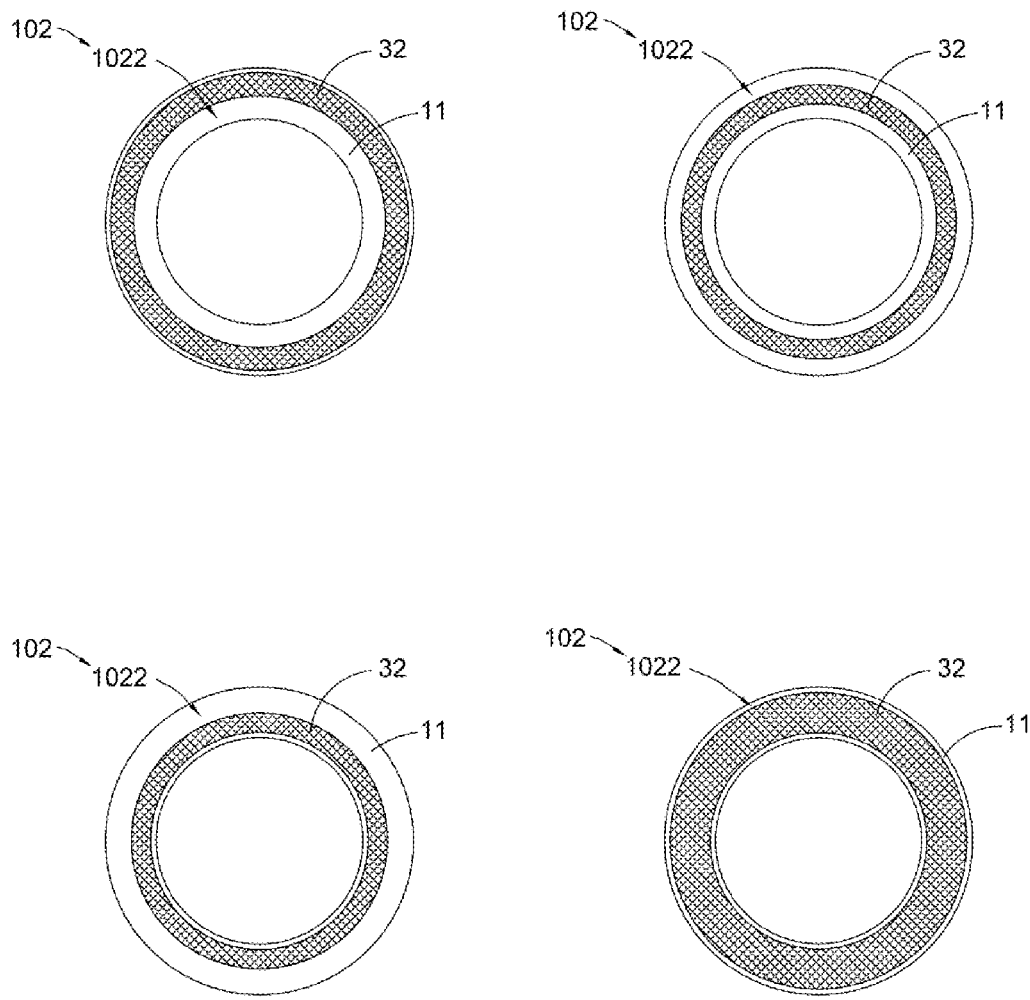
FIG. 10 is a schematic plan view of the second heating element of the optical device according to the above-mentioned preferred embodiment of the present disclosure, which is arranged at four different positions of a bottom non-clear region of the first lens element.

As shown in FIG. 10, further, the second heating element 32 is arranged in the bottom non-clear region 1022 of the first lens element 11, wherein the second heating element 32 is preferably implemented as a type of circle ring-shaped structure attached to the bottom non-clear region 1022, and wherein a width of the second heating element 32 is smaller than a width of the bottom non-clear region 1022. It can be understood that the second heating element 32 may be arranged at a position close to the outer diameter (i.e., outer peripheral position), or a center position, or a position close to the inner diameter (i.e., inner peripheral position) of the bottom non-clear region 1022 of the first lens element 11, or a position of the entire region, so as to realize the installation of the second heating element 32 at different positions of the bottom non-clear region 1022 of the first lens element 11, to provide more optional positions or angles for the access of the leads, thereby reducing the installation difficulty. It is not limited in this regard.

Optionally, the width of the second heating element 32 may be substantially equal to the width of the bottom non-clear region 1022, that is, the second heating element 32 substantially completely covers the entire region of the bottom non-clear region 1022. In this case, the entire region of the bottom non-clear region 1022 of the first lens element 11 can be uniformly heated, and the effect of defogging or accelerating the dissipation of moisture is better. Moreover, it is ensured that the lens element 10 in the optical device 100 is uniformly heated, and the optical axis of the lens element 10 is not prone to deviate from the geometric center axis, thereby ensuring the performance index and imaging quality of the optical device 100.

In this embodiment, the second heating element 32 is disposed in a symmetrical structure, wherein the two second pins 321 are symmetrically located on two sides of the second heating element 32, respectively, that is, the two second pins 321 are disposed symmetrically at 180°, and thus the leads are symmetrically connected to two sides of the second heating element 32 at 180°, so that the second heating element 32 can generate heat uniformly to ensure that the lens element 10 in the optical device 100 is uniformly heated, and the optical axis of the lens element 10 is not prone to deviate from the geometric center axis. Optionally or alternatively, the two second pins 321 may also be arranged asymmetrically on the second heating element, and the second heating element 32 may also generate heat uniformly, which is not limited here.

As shown in FIGS. 5A to 5C, preferably, the second heating element 32 is implemented as a wavy ring-shaped structure, wherein the second heating element 32 has a plurality of ring rows of protrusions 322, wherein the protrusions 322 are sequentially connected to form a ring-shaped structure. Further, the two second pins 321 can be disposed at any position of the second heating element 32 without overlapping each other, that is, the radian of the interval between the two second pins 321 may be less than or equal to 180°, but they do not overlap.

It is worth mentioning that the resistance of the second heating element 32 can be changed by presetting the number of the protrusions 322, so that the heat generation power of the second heating element 32 is adjustable under the same voltage or current condition. That is to say, if the number of protrusions 322 increases, the distance between adjacent protrusions 322 decreases, and the total length of the second heating element 32 increases, so that the resistance of the second heating element 32 increases. If the number of protrusions 322 decreases, the distance between adjacent protrusions 322 increases, and the total length of the second heating element 32 decreases, thereby reducing the resistance of the second heating element 32.

As shown in FIG. 5A, the distance between adjacent protrusions 322 of the second heating element 32 is preset to a normal distance D1, wherein the resistance value of the second heating element 32 is a first resistance value. As shown in FIG. 5B, the distance between adjacent protrusions 322 of the second heating element 32 is preset to a larger distance D2, wherein the resistance value of the second heating element 32 is a second resistance value. As shown in FIG. 5C, the distance between adjacent protrusions 322 of the second heating element 32 is preset to a smaller distance D3, wherein a resistance value of the second heating element is a third resistance value. It can be seen that the first resistance value is greater than the second resistance value, and the third resistance value is greater than the first resistance value. It can be understood by those skilled in the art that the distance between adjacent protrusions 322 may be set arbitrarily, wherein the number of protrusions 322 is not limited.

As shown in FIGS. 6A and 6B, in the third modified implementation of this embodiment, the second heating element 32 is implemented as a multi-ring structure formed by a plurality of heating elements connected in parallel. Optionally, the second heating element 32 comprises a first element 323, a second element 324, and a third element 325, wherein the first element 323, the second element 324, and the third element 325 are sequentially juxtaposed in the bottom non-clear region 1022 of the first lens element 11 in a ring shape, and are connected in parallel with each other. That is to say, the first element 323, the second element 324, and the third element 325 are implemented as three ring-shaped parallel-connected electric heating wires, and the second heating element 32 is formed into a three-ring structure with three electric heating wires connected in parallel. A diameter of the first ring element 323 is greater than a diameter of the second ring element 324, wherein the diameter of the second ring element 324 is greater than a diameter of the third ring element 325, and wherein two pins 321 are symmetrically disposed on two sides of the first element 323. It can be seen that the second heating element 32 composed of the first element 323, the second element 324, and the third element 325 connected in parallel makes the resistance of the second heating element 32 effectively reduced, so that the second heating element 32 can meet the requirement of higher power to provide heat under the condition that the voltage is limited to be smaller.

As shown in FIG. 6B, optionally, the second heating element 32 may further comprise a fourth element 326, wherein the fourth element 326 is juxtaposed in parallel with the third element 325, so that the second heating element 32 forms a four-ring structure with four electric heating wires connected in parallel, to further change the resistance value of the second heating element 32. It can be understood by those skilled in the art that, in order to change the resistance value of the second heating element 32 to meet the requirement of different powers, the second heating element 32 may also be implemented as a two-ring structure with two electric heating wires connected in parallel, or a five-ring structure with five heating wires connected in parallel, or a six-ring structure, etc, which is not limited here.

Figure 7A:
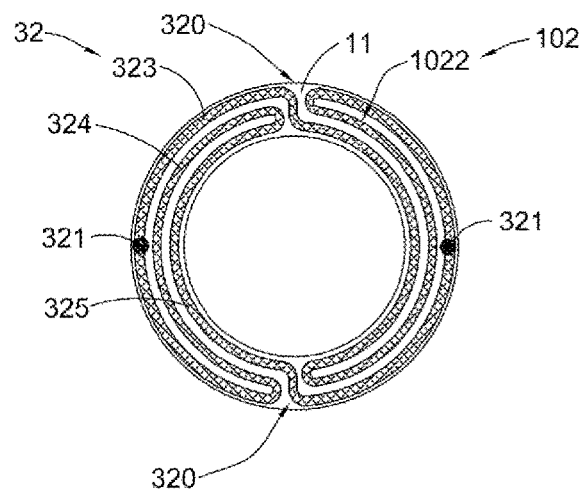
FIG. 7A is a schematic plan view of the second heating element of the optical device according to the above preferred embodiment of the present disclosure, which is implemented as a three-ring structure formed by connecting three electric heating wires in series.
Figure 7B:
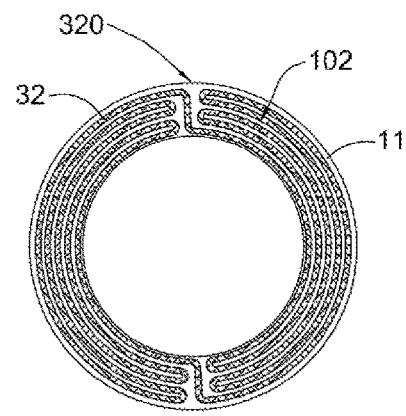
FIG. 7B is a schematic plan view of the second heating element of the optical device according to the above preferred embodiment of the present disclosure, which is implemented as a five-ring structure formed by connecting five electric heating wires in parallel.

As shown in FIGS. 7A and 7B, in the fourth modified implementation of this embodiment, the second heating element 32 is implemented as a multi-ring structure formed by a plurality of heating elements connected in series. It is different from the above-mentioned third modified implementation in that the second heating element 32 is implemented as a multi-ring structure by selecting two, three, four or more electric heating wires to be connected successively in series, thereby changing the resistance value of the second heating element 32. As shown in the figure, the first element 323, the second element 324, and the third element 325 of the second heating element 32 are sequentially connected in series, wherein the second heating element 32 forms a three-ring structure with three electric heating wires connected in series, and wherein upper and lower sides of the second heating element 32 each have a series port 320 so that the outermost electric heating wire and the innermost heating wire are connected in series. As shown in the figure, the second heating element 32 is a five-ring structure formed by five electric heating wires connected in series. It can be understood by those skilled in the art that the second heating element 32 may also be implemented as a seven-ring structure formed by seven electric heating wires connected in series, or the second heating element may be implemented as an odd-numbered-ring structure such as a nine-ring structure so as to adjust the resistance value of the second heating element 32.

It can be understood that the resistance values at other positions except the resistance value at the position of the series port 320 of the second heating element 32 are the same. Therefore, the heat generation efficiency of the second heating element 32 under the same radian of ring, and the second pins 321 may be disposed symmetrically, so that the bottom non-clear region 1022 of the first lens element 11 is heated uniformly.

Figure 8:
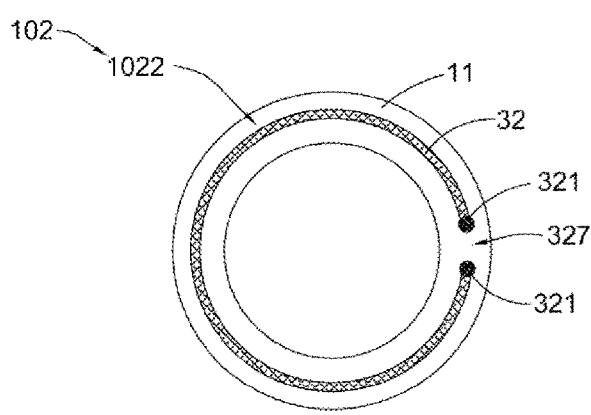
FIG. 8 is a schematic plan view of the second heating element of the optical device according to the above-mentioned preferred embodiment of the present disclosure, which is implemented as a unidirectionally extending arc-shaped structure.

As shown in FIG. 8, in the fifth modified implementation of this embodiment, the second heating element 32 is implemented as a unidirectionally extending arc-shaped structure, and the radian is less than 360°, wherein two ends of the second heating element 32 are not in contact and a gap 327 is formed between the two ends, and wherein the two second pins 321 are disposed at the two ends of the second heating element 32, respectively, so that the second heating element 32 generates heat uniformly.

Figure 9:
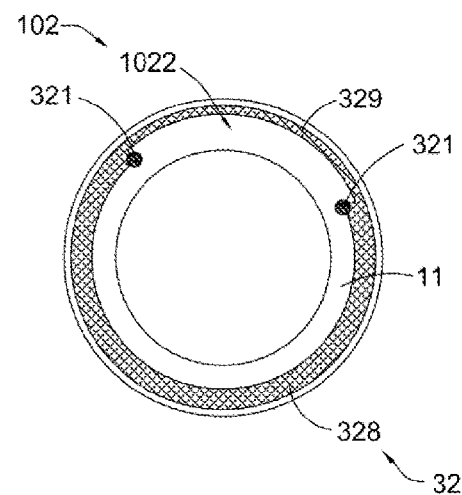
FIG. 9 is a schematic plan view of the second heating element of the optical device according to the above-mentioned preferred embodiment of the present disclosure, which is implemented as a ring-shaped structure with different widths.

As shown in FIG. 9, in the sixth modified implementation of this embodiment, the second heating element 32 comprises a wide heating element 328 and a narrow heating element 329, wherein the narrow heating element 329 is integrally connected to the two ends of the wide heating element 328 to form a ring-shaped structure with different widths, and wherein a width of the narrow heating element 328 is smaller than a width of the second heating element 32, and the wide heating element 328 has an electric heating wire with a larger width, and the narrow heating element 329 has an electric heating wire with a smaller width. The two second pins 321 are arranged at the two ends of the wide heating element 328, so that the second heating element 32 uniformly generates heat and the bottom non-clear region 1022 of the first lens element 11 is heated uniformly. It can be understood that the installation position of the second pin 321 is fixed. Therefore, when the second heating element 32 is installed, the access position of the lead needs to be determined in advance to prevent wiring failure.

It can be seen that the shape of the second heating element 32 may be set arbitrarily, and is less limited by the optical device 100's own structure, thereby meeting the defogging requirements of optical devices of different structural types.

In the seventh modified implementation of this embodiment, the second heating element 32 is arranged in the side non-clear region 1021 of the first lens element 11, and its arrangement is similar to that the second heating element 32 is arranged in the bottom non-clear region 1022 of the first lens element 11, which will not be described repeatedly in detail here. In other words, the second heating element 32 can be arranged at the upper, middle or lower position of the side non-clear region 1021, which is not limited here. The second heating element 32 is implemented as a wavy ring structure with different numbers of the protrusions 322. Alternatively, the second heating element 32 may be implemented as a multi-ring structure in which two, three, four, five or more heating wires are juxtaposed, or the second heating element 32 may be implemented as a multi-ring structure formed by three, five, seven or more odd-numbered electric heating wires connected in series, wherein the two second pins 321 may be symmetrically arranged on two ends of the second heating element 32, or may also be arranged at any position or angle of the second heating element 32 without overlapping each other. Alternatively, the second heating element 32 is implemented as a unidirectionally extending arc-shaped structure, or the second heating element 32 is implemented as a ring-shaped structure with different widths, which is not limited here.

It should be pointed out that the second heating element 32 may only be arranged in the side non-clear region 1021 of the first lens element 11, or the second heating element 32 may also be arranged in the bottom non-clear region 1022 of the first lens element 11, or the second heating element 32 may also be arranged at the side non-clear region 1021 and the bottom non-clear region 1022 of the first lens element 11 at the same time, which is not limited here.

It can be seen that the clear region 101 and the non-clear region 102 of the first lens element 11 may only be arranged with the first heating element 31, and there is no need to arrange the second heating element 32 in the non-clear region 102, wherein the first pin 311 is disposed in the non-clear region 102. Alternatively, the first heating element 31 may be arranged in the clear region 101 and the side non-clear region 1021 at the same time, wherein the second heating element 32 is arranged in the bottom non-clear region 1022. Alternatively, the first heating element 31 may be arranged in the clear region 101 and the bottom non-clear region 1022 at the same time, wherein the second heating element 32 is arranged in the side non-clear region 1021. Alternatively, the first heating element 31 is arranged in the outer clear region 1011 or the inner clear region 1012 of the clear region 101, wherein the second heating element 32 is arranged in the side non-clear region 1021 or the bottom non-clear region 1022 of the non-clear region 102, which is not limited here.

Further, this embodiment further provides a method for manufacturing the optical device, comprising the following steps:
A. providing the lens barrel 20 and the lens element 10, wherein the lens element 10 is installed in the installation cavity of the lens barrel 20; and
B. arranging the heating element 30 on a surface of the first lens element 11 near an object side in a manner capable of being powered-on to generate heat, to heat the first lens element 11, wherein the heating element 30 is used to be connected to a power supply unit and generate heat, so that the lens element 10 is heated to accelerate the dissipation of moisture attached to the surface, and prevent the surface of the first lens element 11 from fogging or frosting at the same time.

The step B comprises step B1: arranging the first heating element 31 in the clear region 101 of the first lens element 11, and arranging the first pins 311 in the non-clear region 102 of the first lens element 11 in a manner of separating from each other, wherein the first pins 311 are electrically connected to the first heating element 31.

The method further comprises step C: extending at least two leads from the first pins 311 to the power supply unit, respectively.

In this embodiment, the method further comprises step C: arranging the second heating element 32 in the non-clear region 102 of the lens element 10.

In this embodiment, an ITO film is plated on an inner surface or an outer surface of the clear region 101 of the lens element 10.

In this embodiment, the shape of the second heating element 32 is preset according to the resistance value of the second heating element 32.

According to a second configuration form of the present application, another structure and arrangement are (additionally or alternatively) adopted, especially for the heating element.

An optical device 100 according to a preferred embodiment of the present disclosure in the second configuration form of the present application is as shown in FIGS. 11 to 18D, wherein the optical device 100 is, for example, a vehicle-mounted lens, an optical lens, an optical lamp cover or the like, and wherein the optical device 100 has a function of actively defogging and defrosting and preventing fogging. That is to say, when the optical device 100 is in an environment of continuous rain, frost, or alternating cold and heat, the optical device 100 can actively defog and defrost and prevent fogging so as to ensure the reliability of optical performance.

Figure 11:
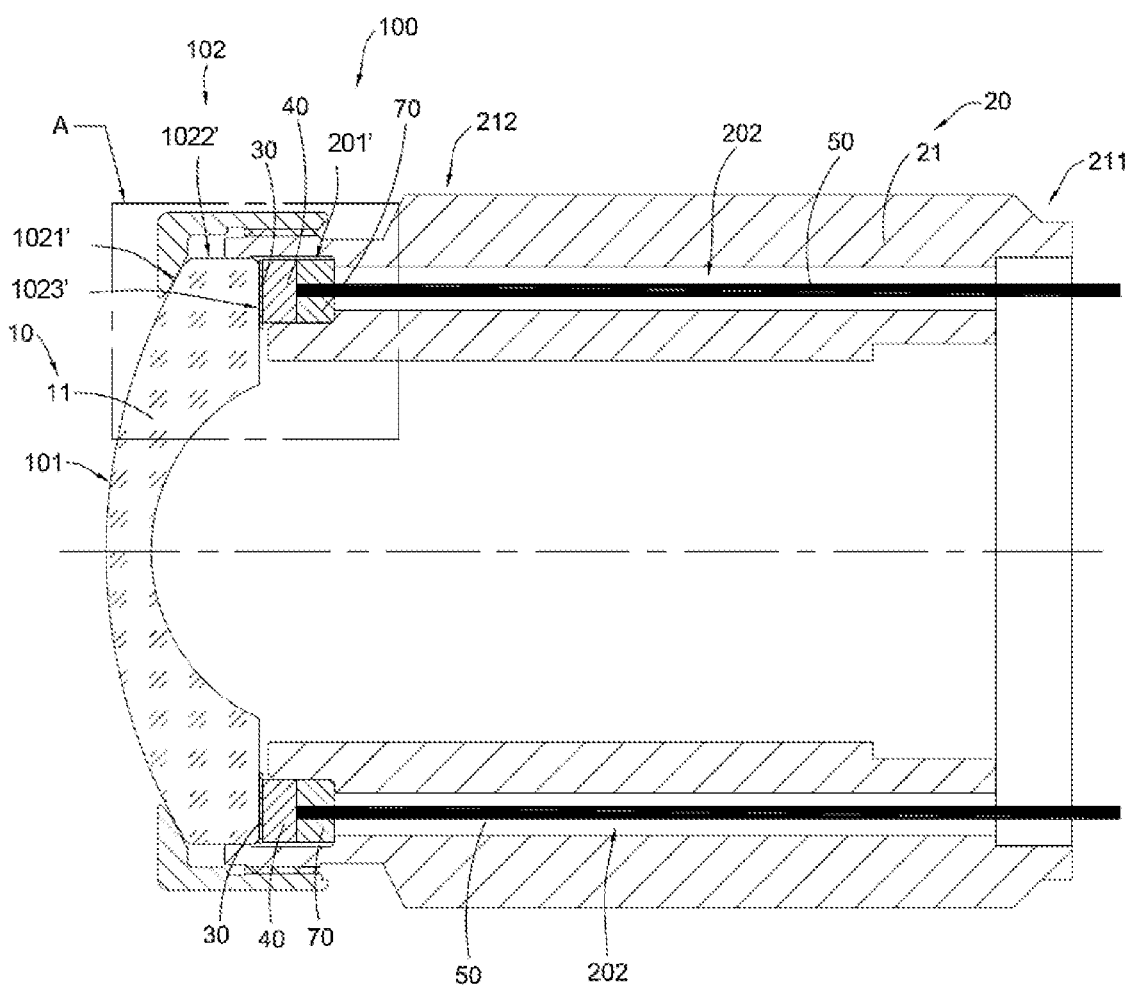
FIG. 11 is a schematic cross-sectional view of an optical device according to a preferred embodiment of the present disclosure in the second configuration form of the present application.
Figure 12:
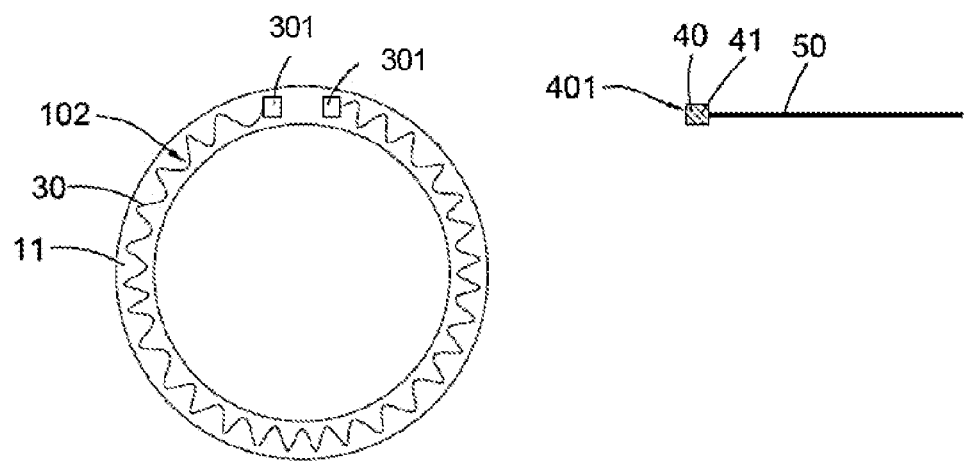
FIG. 12 is a structural schematic view of a heating element arranged on a lens element and a conductive element of the optical device according to the above-mentioned preferred embodiment of the present disclosure.
Figure 13:
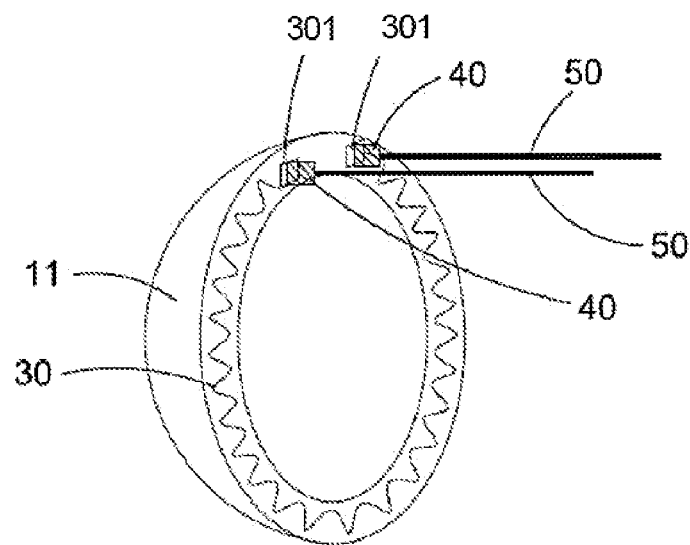
FIG. 13 is a schematic structural view of the optical device according to the above preferred embodiment of the present disclosure, in which a conductive contact surface of a conductive element is in contact and connection with a terminal of the heating element.

As shown in FIGS. 11, 12 and 13, preferably, the optical device 100 comprises at least one lens element 10, a lens barrel 20, at least one heating element 30 and at least two conductive elements 40, wherein the lens element 10 is installed in the lens barrel 20, the heating element 30 is provided on the lens element 10, wherein the heating element 30 has at least two terminals 301 (including a positive terminal and a negative terminal), wherein the at least two conductive elements 40 are respectively fixed to the corresponding positions where the at least two terminals 301 are in contact and electrical connection. The at least two conductive elements 40 each have a conductor terminal 41, wherein the conductor terminal 41 of the at least two conductive elements 40 is used to be connected to a power supply device through at least two conductors 50, so that the electric power provided by the power supply device is introduced into the heating element 30 via the conductive elements 40 through conductors 50, wherein the heating element 30 can convert the electric energy into heat energy and heat the lens element 10 so as to accelerate the dissipation of moisture attached to the surface of the lens element 10, which has the effect of defogging or defrosting and preventing fogging.

Optionally, the optical device 100 may be implemented as an optical protective cover, wherein the optical protective cover has a light-transmitting cover, wherein the light-transmitting cover may be made of plastic material, glass material, crystal material or the like, and wherein the heating element 30 is arranged on the light-transmitting cover to accelerate the dissipation of moisture or fog or frost attached to the inner or outer surface of the light-transmitting cover, thereby having an active defogging and defrosting function, or preventing the formation of fog or frost on the inner or outer surface of the light-transmitting cover.

Further, the lens element 10 comprises a first lens element 11 located near the object side of the lens barrel 20, wherein the heating element 30 is preferably implemented as an electric heating wire, such as silver wire, copper wire, iron-chromium wire, chromium-nickel and other metals or alloy materials, wherein the electric heating wire material may also be a conductive adhesive, conductive silver paste, conductive carbon paste or the like, wherein the heating element 30 is arranged in the non-clear region 102 of the first lens element 11, and wherein the at least two terminals 301 of the heating element 30 are arranged in the non-clear region 102 of the first lens element 11 without overlapping each other. Optionally, the heating element 30 may also comprise an ITO film, wherein the heating element 30 is arranged in the clear region 101 of the first lens element 11, and wherein the at least two terminals 301 of the heating element 30 are arranged in the non-clear region 102 of the first lens element 11 without overlapping each other.

Optionally, the first lens element 11 is substantially implemented as a convex-concave structure from an outer surface to an inner surface, or may also be implemented as a concave-convex structure, a biconcave structure, a biconvex structure or the like from the outer surface to the inner surface, wherein a peripheral region 1021' of the outer surface, a side surface 1022', or a peripheral region 1023' of the inner surface of the first lens element 11 is supported against the wall of the lens barrel 20 so as to form the non-clear region 102. Alternatively, the peripheral region 1023' of the inner surface of the first lens element 11 is supported against a spacing member such as a spacer ring or a washer, or the periphery of the inner surface of the first lens element 11 is directly supported against the peripheral region of the adjacent lens element located inside the first lens element 11, thereby forming the non-clear region 102. Alternatively, the peripheral region 1021' of the outer surface of the first lens element 11 is fixed by an inner pressing ring, wherein the inner pressing ring is threaded on an inner wall the lens barrel 20, and wherein the peripheral region 1021' of the outer surface of the first lens element 11 is supported against the inner pressing ring, so that the peripheral region 1021' of the outer surface of the first lens element 11 represents the non-clear region 102. Alternatively, the peripheral region 1021' of the outer surface of the first lens element 11 is fixed by an outer pressing ring, wherein the outer pressing ring is threaded on the outer wall of the lens barrel 20, and wherein the peripheral region of the outer surface of the first lens element 11 is supported against the outer pressing ring, so that the peripheral region 1021' of the outer surface of the first lens element 11 represents the non-clear region 102. That is to say, the non-clear region 102 of the first lens element 11 is a combination of one or more selected from the peripheral region 1021' of the outer surface, the side surface 1022', and the peripheral region 1023' of the inner surface of the first lens element 11, and correspondingly, a position where the terminal 301 of the heating element 30 is disposed on the first lens element 11 is a combination of one or more selected from the peripheral region 1021' of the outer surface, the side surface 1022', and the peripheral region 1023' of the inner surface of the first lens element 11.

It can be understood that one of the conductive elements 40 is electrically connected to the terminal 301 of the positive electrode of the heating element 30, and the conductor terminal 41 of the conductive element 40 of the positive electrode is connected to the positive electrode of the power supply device through one conductor 50. The other conductive element 40 is electrically connected to the terminal 301 of the negative electrode of the heating element 30, and the conductor terminal 41 of the conductive element 40 of the negative electrode is connected to the negative electrode of the power supply device through the other conductor 50, so that the terminals 301 of the positive and negative electrodes of the heating element 30 are connected to the positive and negative electrodes of the power supply device through the conductive elements 40 and the conductors 50, respectively, and thus the power supply device can supply electric power to the heating element 30 smoothly.

In other words, the heating element 30 and the conductors 50 are electrically connected indirectly through the conductive elements 40, wherein the conductors 50 are electrically connected to the conductor terminals 41 of the conductive elements 40, and wherein the conductive elements 40 are electrically connected to the terminals 301 of the heating element 30. Preferably, the conductors 50 are welded and connected to the conductor terminals 41 of the conductive elements 40, wherein the conductive elements 40 and the terminals 301 of the heating element 30 are connected in a contact and electrical connection manner without welding, and the conductors 50 do not need to be directly connected (for example, welded) to the terminals 301 of the heating element 30, which reduces the difficulty of the manufacturing process. The resistance value of the terminal 301 of the heating element 30 of the optical device 100 in this solution can be basically the same as that of other positions, so that the heating element 30 can generate heat uniformly. In other words, the conductive element 40 serves as a transition element for the indirect connection between the heating element 30 and the conductor 50, avoiding the problem of uneven heat generation of the heating element 30 caused by the connection between the heating element 30 and the conductor 50 due to welding or the like, so that the heating element 30 can uniformly heat the lens element 10 of the optical device 100, namely, accelerating the dissipation of moisture attached to the surface of the lens element 10 or preventing fogging or frosting on the surface of the lens element 10, and ensuring the optical performance of the optical device 100.

It is worth mentioning that, according to the shape and structure of the heating element 30 and the arrangement position of the terminal 301, the shape and structure of the conductive element 40 can be adjusted adaptively, wherein the shape and structure of the conductive element 40 are preset in such a manner that the conductive element 40 can be fixed and held at a position that matches and electrically connects with the terminal 301 of the heating element 30, and at the same time, the connection between the conductive element 40 and the conductor 50 can realize the multi-angle or multi-position access of the conductor 50, reducing the process difficulty. In this embodiment, the conductive element 40 may be made of electrically conductive material such as metal material, alloy material such as copper alloy or aluminum alloy, composite metal material, conductive fillers, carbon material or polymer conductive material, wherein the conductive element 40 may be a shaped structure formed by any combination of blocks, dots, arcs, sheets, strips, bulks, or irregular shapes, etc., made of electrically conductive materials, which is not limited here.

It can be understood that since the conductive contact area of the conductive element 40 is significantly larger than the joint area of a usual line conductor, the conductive element 40 and the terminal 301 of the heating element 30 can be electrically connected together in a direct contact manner, the conductive element 40 has a certain volume and is easy to fix, without the need of welding connection with the terminal 301 of the heating element 30, which not only reduces the process difficulty, but also ensures the reliability of the connection.

As shown in FIGS. 12 and 13, further, the conductive element 40 has a conductive contact surface 401, wherein the conductive contact surface 401 is electrically connected to the terminal 301 in a surface contact manner, wherein the conductive contact surface 401 has a certain area, wherein the terminal 301 of the heating element 30 is, for example, a pad, and wherein the conductive contact surface 401 and the terminal 301 can be exactly matched and contacted and connected with each other. Optionally, the terminal 301 of the heating element 30 may also be implemented as a dot-like structure, wherein the conductive contact surface 401 and the terminal 301 are electrically connected in a point-to-surface contact manner, wherein the conductive contact surface 401 may be implemented to be in surface-to-surface contact with the first lens element 11. Compared with the traditional manner that the conductor is directly welded to the heating element, the conductive contact surface 401 of the conductive element 40 of the present application is significantly larger than the cross section of the conductor, wherein the conductive contact surface 401 of the conductive element 40 has a certain contact area with the terminal 301 of the heating element 30, thereby increasing the connection stability between the conductive contact surface 401 of the conductive element 40 and the terminal 301 of the heating element 30.

In the manufacturing process, the conductive contact surface 401 is electrically connected to the terminal 301 in a surface contact manner, which improves the accuracy of connection between the conductive element 40 and the terminal 301 of the heating element 30, reduces the installation difficulty and improves the product yield. Moreover, a large-area solder joint such as a tin solder joint will not be formed between the conductive contact surface 401 and the terminal 301, thereby ensuring that the resistance at the position of the terminal 301 of the heating element 30 will not be significantly increased, so as to ensure the heat generation uniformity of the heating element 30.

It is worth mentioning that the shape and size of the conductive contact surface 401 of the conductive element 40 can be preset according to actual requirements, so that the area of electrical contact and electrical connection between the conductive contact surface 401 of the conductive element 40 and the terminal 301 of the heating element 30 can be preset according to actual requirements, thereby avoiding the problem of greater difficulty in welding due to the very small welding area between the traditional conductor and the electric heating wire, and improving the yield of the product.

Optionally, the conductive element 40 is bonded and fixed to a position in electrical contact with the terminal 301 of the heating element 30 through a conductive adhesive 60, so that the conductive element 40 and the heating element 30 located on the first lens element 11 are kept relatively fixed and possess the reliability of electrical conduction, which realizes simple assembly and reduces the connection cost of the terminal 301 of the heating element 30. In other words, the conductive adhesive 60 is dispensed between the conductive contact surface 401 of the conductive element 40 and the terminal 301 of the heating element 30 of the first lens element 11, or the conductive adhesive 60 is dispensed between the conductive contact surface 401 of the conductive element 40 and the surface of the first lens element 11 and is electrically contacted and connected to the terminal 301 of the heating element 30, so that a conductive adhesive layer is formed between the conductive contact surface 401 of the conductive element 40 and the heating element 30 located on the first lens element 11, wherein the conductive adhesive 60 is a cured or dried adhesive with certain electrical conductivity, and wherein the conductive adhesive may be a silver-based conductive adhesive, a gold-based conductive adhesive, a copper-based conductive adhesive, a carbon-based conductive adhesive or the like, which is not limited here.

Figure 14A:
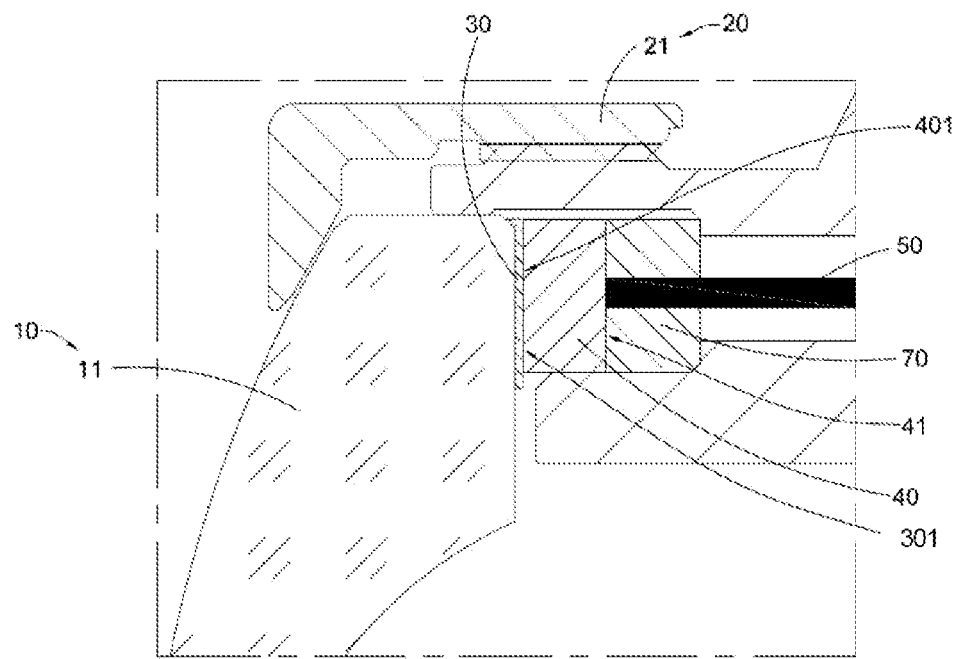
FIG. 14A is an enlarged schematic view of region A of the optical device according to the above-mentioned preferred embodiment of the present disclosure.

As shown in FIG. 14A, optionally, the optical device 100 further comprises at least one fixing element 70, wherein the conductive element 40 is fixed and held by the fixing element 70 at a position in contact and electrical connection with the terminal 301 of the heating element 30 located on the first lens element 11, so that the conductive element 40 and the heating element 30 located on the first lens element 11 are kept relatively fixed, and the conductive contact surface 401 of the conductive element 40 is just kept in contact with the terminal 301 of the heating element 30. Preferably, the fixing element 70 is implemented as an elastic element such as a spring, a wave spring or an elastic ring, and the fixing element 70 may be made of electrically conductive material or non-conductive material, wherein the fixing element 70 attaches the conductive element 40 closely to the terminal 301 of the heating element 30 by means of elasticity. Specifically, the fixing element 70 is provided with a certain elasticity between the wall of the lens barrel 20 and the conductive element 40, wherein one end of the fixing element 70 is disposed on the wall of the lens barrel 20, wherein the other end of the fixing element 70 is disposed on the conductive element 40, wherein the elastic force generated by the fixing element 70 makes the conductive contact surface 401 of the conductive element 40 closely attached to the terminal 301 of the heating element 30 and relatively fixed with the first lens element 11, so as to ensure the stability of the electrical circuit and prevent loosening during heating up or when the optical device 100 moves and affecting the heat generation efficiency of the heating element 30.

Figure 14B:
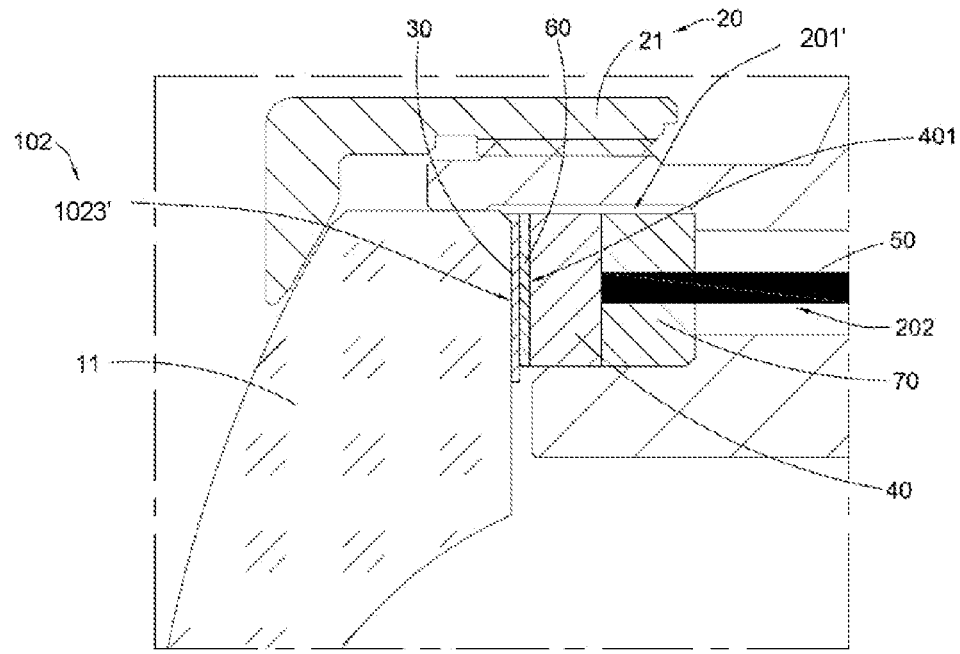
FIG. 14B is an enlarged schematic view of region A of the optical device according to the above-mentioned preferred embodiment of the present disclosure, in which a conductive adhesive and a fixing element are simultaneously used.

As shown in FIG. 14B, in this embodiment, in order to further enhance the connection reliability between the conductive contact surface 401 of the conductive element 40 and the terminal 301 of the heating element 30, the conductive element 40 is fixed and held by the fixing element 70 at a position in contact and electrical connection with the terminal 301 of the heating element 30, and at the same time, the conductive contact surface 401 of the conductive element 40 and the terminal 301 of the heating element 30 are bonded and connected by the conductive adhesive 60, thereby further having the effect of preventing loosening between the conductive element 40 and the heating element 30 located on the first lens element 11 at high temperatures and affecting the heat generation of the heating element 30.

Preferably, the terminal 301 of the heating element 30 is disposed in a peripheral region 1023' (located in the non-clear region 102) of the inner surface of the first lens element 11, wherein the lens barrel 20 has at least one fixed cavity 201' and at least one conductor channel 202, wherein the fixed cavity 201' is located between the peripheral region 1023' of the inner surface of the first lens element 11 and a barrel wall 21 of the lens barrel 20, and wherein the conductor channel 202 communicates with the fixed cavity 210 and extends along the inside of the barrel wall 21 to the bottom 211 of the barrel wall 21. The conductive element 40 is installed in the fixed cavity 201', and the conductive contact surface 401 is attached to the terminal 301 of the heating element 30, wherein the conductive contact surface 401 of the conductive element 40 and the terminals 301 of the heating element 30 are bonded and connected by means of dispensing the conductive adhesive 60, wherein the fixing element 70 is installed in the fixed cavity 201' and located between the conductive element 40 and the barrel wall 21, and wherein the fixing element 70 provides a force so that the conductive element 40 is held and fixed to the terminal 301 of the heating element 30. Optionally, the fixing element 70 is installed in the fixed cavity 201' and located between the conductive element 40, the barrel wall 21 and the first lens element 11, and provides the force. That is to say, the force provided by the fixing element 70 fixes and holds the conductive element 40 on the peripheral region 1023' of the inner surface of the first lens element 11, and the conductive element 40 is just in electrical contact with the terminal 301, so as to prevent loosening. The conductor 50 extends from the conductor terminal 41 of the conductive element 40 in the fixed cavity 201' along the conductor channel 202 to the bottom 211 of the barrel wall 21, and is connected to the power supply device, so as to realize the rationality of electric power supply.

Further, the fixing element 70 is implemented as an elastic element, wherein one end of the fixing element 70 is installed on the conductive element 40, and the other end is installed on the barrel wall 21 or is installed on a lens element adjacent to the inner side of the first lens element 11, wherein the fixing element 70 provides a certain elastic force to fix and hold the conductive contact surface 401 of the conductive element 40 to the terminal 301 of the heating element 30. In other words, the fixing element 70 is in a compressed state between the conductive element 40 and the barrel wall 21, so that the fixing element 70 can constantly provide elastic force to act on the fixing element 70, so that the fixing element 70 can always be held at a position in electrical contact with the terminal 301 of the heating element 30.

Optionally, it may be unnecessary to provide the conductive adhesive 60 between the conductive element 40 and the terminal 301 of the heating element 30, and the conductive contact surface 401 of the conductive element 40 can also be fixed and held by the fixing element 70 alone at a position where it is always in electrical contact with the terminal 301 of the heating element 30, which may also achieve the reliability of electrical conduction, and prevent loosening during heating up or when the optical device 100 moves and affecting the heat generation efficiency of the heating element 30.

Optionally, the conductive contact surface 401 of the conductive element 40 and the terminal 301 of the heating element 30 may be bonded and connected by the conductive adhesive 60 alone without the fixing element 70 being provided, which may also realize the reliability of electrical conduction, and prevent loosening during heating up or when the optical device 100 moves and affecting the heat generation efficiency of the heating element 30.

Figure 14C:
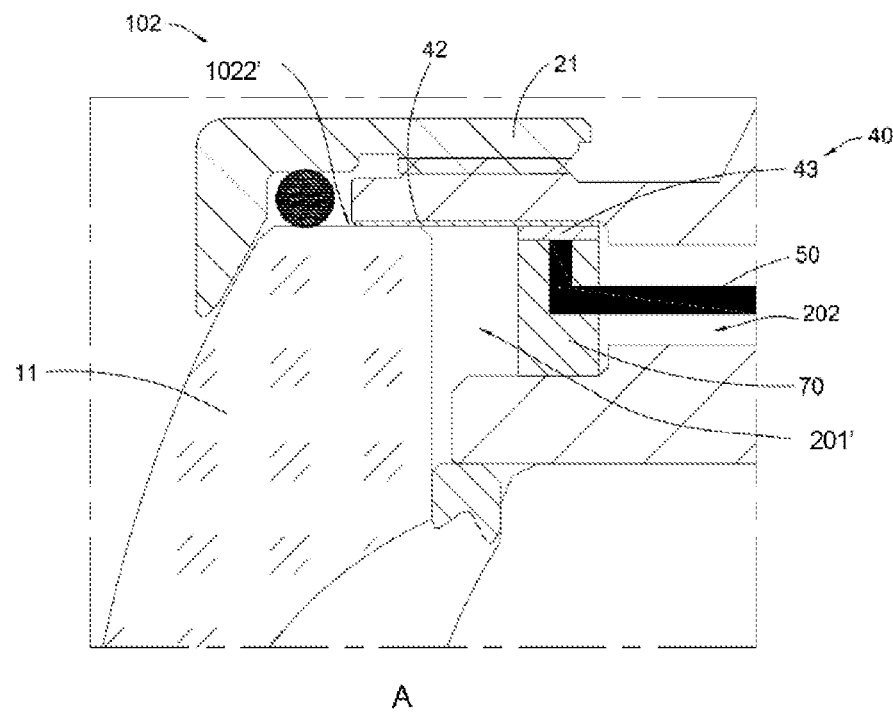
FIG. 14C is an enlarged schematic view of region A of a first modified implementation of the optical device according to the above-mentioned preferred embodiment of the present disclosure.

As shown in FIG. 14C, in the first modified implementation of this embodiment, the terminal 301 of the heating element 30 is disposed on the side surface 1022' of the first lens element 11, wherein the conductive element 40 comprises a first conductive element 42 and a second conductive element 43, wherein the first conductive element 42 has the conductive contact surface 401, wherein the first conductive element 42 is fixed between the side surface 1022' of the first lens element 11 and the barrel wall 21, and the conductive contact surface 401 is in electrical contact with the terminal 301, wherein the second conductive element 43 is disposed in the fixed cavity 201', wherein the first conductive element 42 is extended to the second conductive element 43 and electrically connected together thereto, and wherein the conductor 50 extends outward from the second conductive element 43 along the conductor channel 202. The fixing element 70 is disposed between the second conductive element 43 and the barrel wall 21, wherein the fixing element 70 provides a force such as an elastic force so that the first conductive element 42 and the second conductive element 43 is fixedly and held at a position in contact and electrical connection with the terminal 301 of the heating element 30. In other words, the fixing element 70 provides elastic force so that the first conductive element 42 and the second conductive element 43 are pressed against the barrel wall 21 in the fixed cavity 201', wherein the first conductive element 42 is extended to the side surface 1022' of the first lens element 11 and is in electrical contact and connection with the terminal 301 of the heating element 30.

Figure 14D:
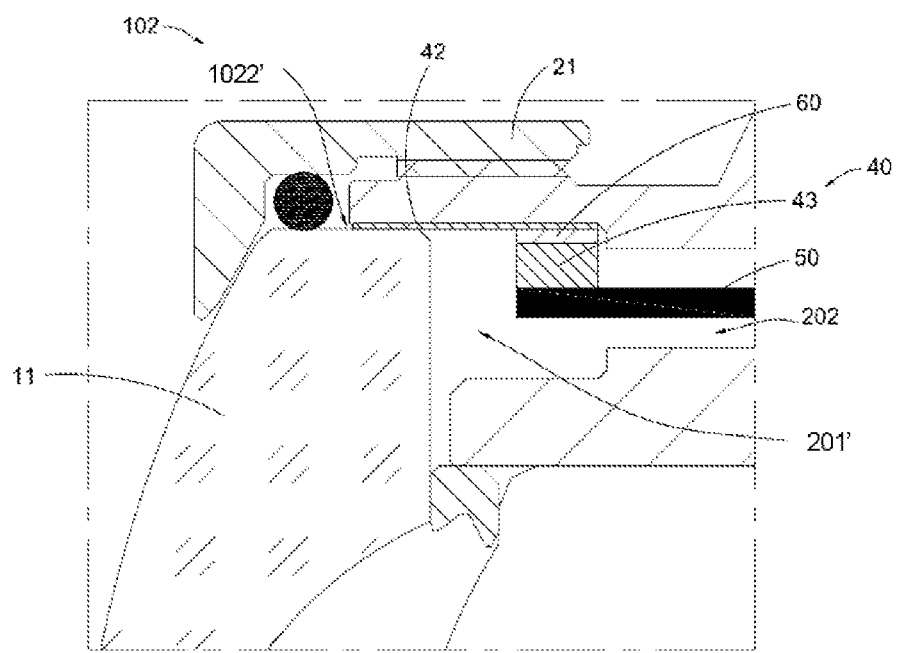
FIG. 14D is an enlarged schematic view of region A using a conductive adhesive of the first modified implementation of the optical device according to the above-mentioned preferred embodiment of the present disclosure.
Figure 21:
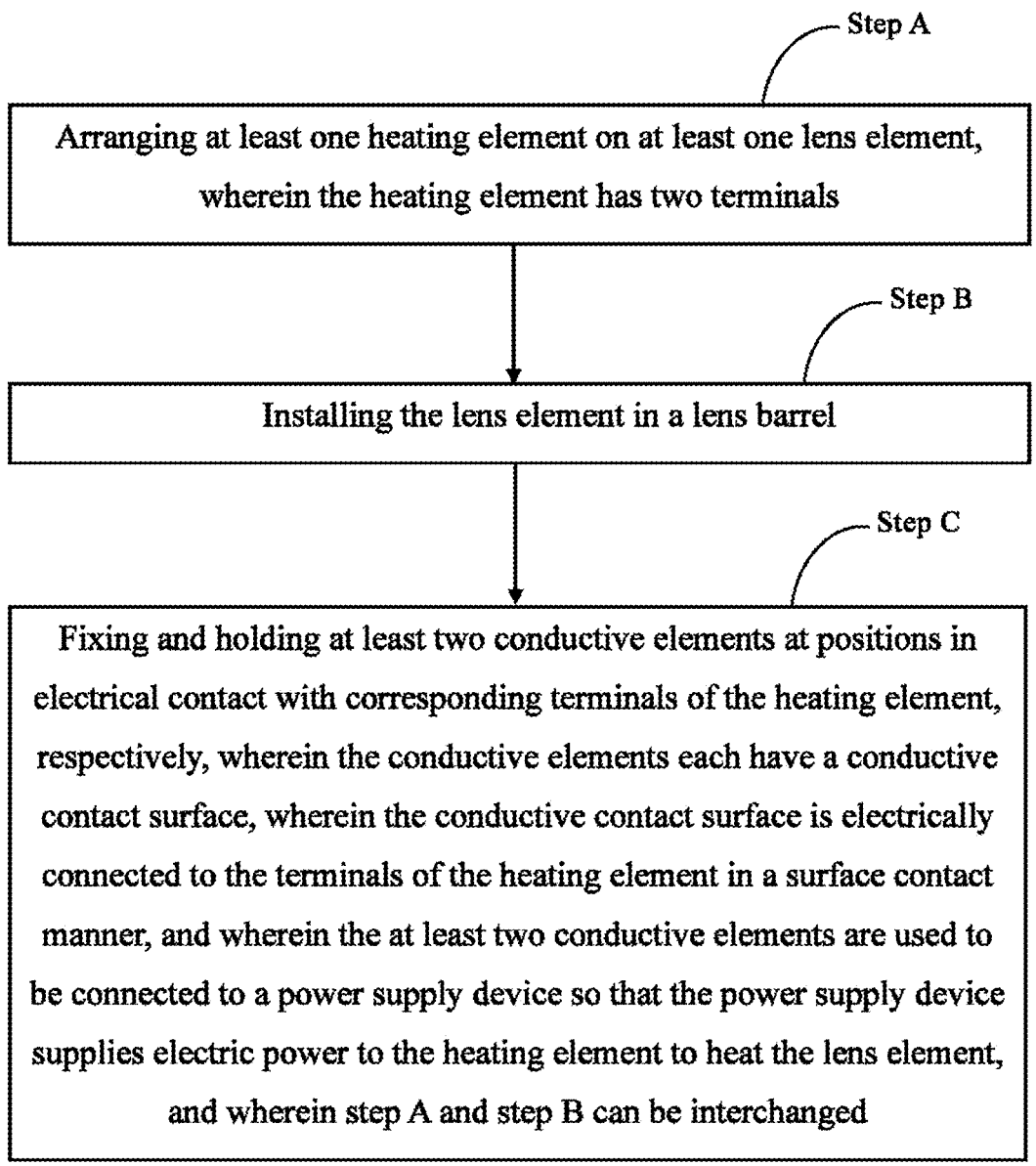
FIG. 21 is a method for manufacturing the optical device according to a preferred embodiment of the present disclosure.

As shown in FIG. 14D, it can be understood that the first conductive element 42 and the second conductive element 43 may be implemented as the same or different conductive materials, wherein the first conductive element 42 and the second conductive element 43 are in contact and electrical connection with each other. Alternatively, to ensure the conductivity performance, the first conductive element 42 and the second conductive element 43 may be integrally connected, or welded, or clamped, or are bonded and connected by the conductive adhesive 60, and so on, which is not limited here. Optionally, the first conductive element 42 and the terminal 301 of the heating element 30 may also be bonded and connected by the conductive adhesive 60. Optionally, the first conductive element 42 and the second conductive element 43 may be implemented as an integral conductive element, which is not limited here. Further provided in this embodiment is a method for manufacturing the optical device 100, comprising the following steps, see FIG. 21:

Step A. arranging at least one heating element 30 on at least one lens element 10, wherein the heating element 30 has two terminals 301;

Step B. installing the lens element 10 in a lens barrel 20; and

Step C. fixing and holding at least two conductive elements 40 at positions in electrical contact with corresponding terminals 301 of the heating element 30, respectively, wherein the conductive elements 40 each have a conductive contact surface 401, wherein the conductive contact surface 401 is electrically connected to the terminals 301 of the heating element 30 in a surface contact manner, and wherein the at least two conductive elements 40 are used to be connected to a power supply device so that the power supply device supplies electric power to the heating element 30 to heat the lens element, 10 and wherein step A and step B can be interchanged.

Figure 15A:
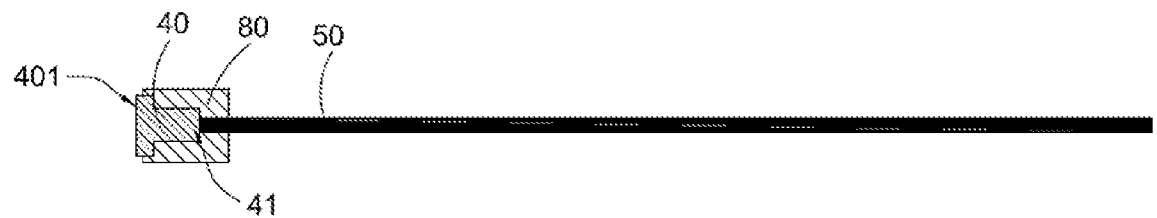
FIG. 15A is a schematic cross-sectional view of a thermal insulating member of a second modified implementation of the optical device according to the above-mentioned preferred embodiment of the present disclosure.

As shown in FIG. 15A, in the second modified implementation of this embodiment, the optical device 100 further comprises a thermal insulating member 80, wherein the thermal insulating member 80 is disposed in the first lens element 11 in a manner to reduce the heat loss of the heating element 30, wherein the thermal insulating member 80 is made of electrically insulated and thermal insulating material, has a thermal insulating effect and is non-conductive, so as to improve the heat generation efficiency of the heating element 30 and reduce heat loss. Further, the terminal 301 of the heating element 30 is arranged in the peripheral region 1023' of the inner surface of the first lens element 11, wherein the thermal insulating member 80 fixes and holds the conductive contact surface 401 of the conductive element 40 at a position in electrical contact with the terminal 301 of the heating element 30, wherein the thermal insulating member 80 is preferably implemented as a circle ring structure, wherein the thermal insulating member 80 is fixed and held on the outer side of the non-clear region 102 of the first lens element 11, wherein the thermal insulating member 80 is installed between the first lens element 11 and the barrel wall 21 of the lens barrel 20 and provides a force so that the conductive element 40 and the first lens element 11 are kept relatively fixed, and wherein the conductive element 40 is fixed and held between the thermal insulating member 80 and the first lens element 11 and is in electrical contact with the terminal 301 of the heating element 30. It can be understood that the contacting surface between the conductive contact surface 401 of the conductive element 40 and the terminal 301 of the heating element 30 may be pre-designed based on actual requirements according to the shape of the terminal 301 of the heating element 30, for example, the area of the conductive contact surface 401 is substantially equal to the area of the terminal 301 of the heating element 30 so as to increase the area of conductive contact and have a wider range of applications, which is not limited here.

It can be seen that, in the second modified implementation, the conductive element 40 may only be fixed and held by the thermal insulating member 80 at a position in electrical contact with the terminal 301 of the heating element 30, and at the same time, the thermal insulating member 80 also has the effect of reducing the heat loss of the heating element 30.

Figure 15B:
FIG. 15B is a schematic cross-sectional view of a fixing element and a thermal insulating member of the second modified implementation of the optical device according to the above-mentioned preferred embodiment of the present disclosure.

As shown in FIG. 15B, optionally, in the second modified implementation, the conductor terminal 41 of the conductive element 40 and the conductor 50 may be connected by means of glue-dispensing or welding, wherein the fixing element 70 is disposed between the conductive element 40 and the thermal insulating member 80 in a manner to enhance the connection effect, wherein the fixing element 70 is, for example, an elastic element, wherein two ends of the fixing element 70 are connected to the conductive element 40 and the thermal insulating member 80, respectively, and wherein the fixing element 70 provides a force such as an elastic force so that the conductive element 40 and the thermal insulating member 80 are relatively fixed, so as to prevent loosening during heating up or when the optical device 100 moves and affecting the heat generation efficiency of the heating element 30.

Further, the thermal insulating member 80 is made of insulated material. For some metal lenses, for example, the barrel wall 21 of the lens barrel 20 is made of metal material, and the thermal insulating member 80 is used to block electrical conduction between the conductive element 40 and the barrel wall 21 so as to ensure the reliability of the electrical circuit.

Figure 15C:
FIG. 15C is a schematic cross-sectional view of the second modified implementation of the optical device according to the above-mentioned preferred embodiment of the present disclosure, in which the thermal insulating member is implemented as a cylindrical structure.
Figure 15D:
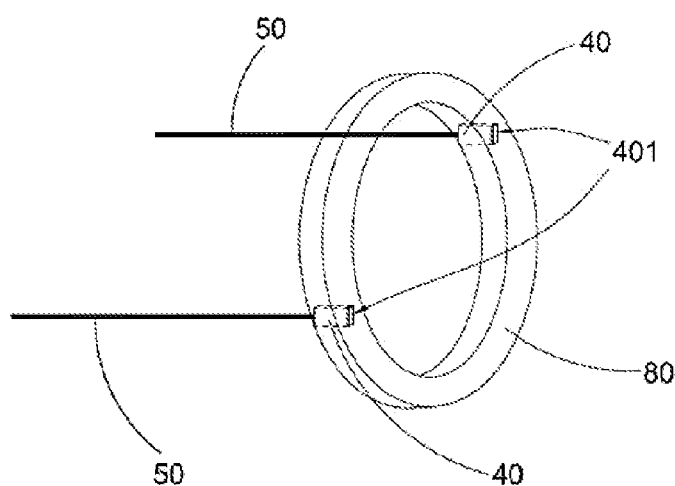
FIG. 15D is a schematic structural view of the second modified implementation of the optical device according to the above-mentioned preferred embodiment of the present disclosure, in which the thermal insulating member is implemented as a ring-shaped structure.

As shown in FIG. 15D, in the second modified implementation, the thermal insulating member 80 is implemented as a ring-shaped structure that is attached to the peripheral region 1023' of the inner surface or the side surface of the first lens element 11, wherein the thermal insulating member 80 is fixed between the first lens element 11 and the barrel wall 21 of the lens barrel 20, wherein the conductive contact surface 401 of the conductive element 40 slightly protrudes from an attachment surface of the thermal insulating member 80, so as to prevent the conductive element 40 from melting and adhering to the thermal insulating member 80 at high temperatures to cause the conductive element 40 to break, thereby ensuring the process reliability.

That is to say, when the heating element 30 is arranged on the peripheral region 1023' of the inner surface of the first lens element 11, the thermal insulating member 80 is attached to the peripheral region 1023' of the inner surface of the first lens element 11, so as to cover the heating element 30 as much as possible to reduce the loss of heat, wherein the conductive elements 40 are separated from each other and arranged at a local position of the thermal insulating member 80, and wherein the conductive contact surface 401 of the conductive element 40 is just in contact and connection with the corresponding terminal 301 of the heating element 30. When the heating element 30 is arranged on the side surface 1022' of the first lens element 11, the thermal insulating member 80 is attached to the side surface 1022' of the first lens element 11, and covers the heating element 30 as much as possible to reduce heat loss, wherein the conductive elements 40 are separated from each other and arranged at a local position of the thermal insulating member 80, and wherein the conductive contact surface 401 of the conductive element 40 is just in contact and connection with the corresponding terminal 301 of the heating element.

As shown in FIG. 15C, optionally, the thermal insulating member 80 is implemented as a cylindrical structure wrapped around the outside of the conductive element 40, wherein the thermal insulating member 80 is used to reduce the heat dissipation at the connection between the conductive contact surface 401 of the conductive element 40 and the terminal 301 of the heating element 30. Optionally, a front end of the conductive element 40 has an elastic body 402, wherein the elastic body 402 forms the conductive contact surface 401, wherein the elastic body 402 is, for example, a spring pin, to strengthen the conductive reliability between the conductive contact surface 401 of the conductive element 40 and the terminal 301 of the heating element 30, and wherein the conductor 50 and the conductor terminal 41 of the conductive element 40 are bonded and fixed by the conductive adhesive 60.

In the second modified implementation, the conductive contact surface 401 of the conductive element 40 slightly protrudes from a surface of the thermal insulating member 80, so as to prevent the conductive element 40 from melting and adhering to the thermal insulating member 80 at high temperatures to cause the conductive element 40 to break. The thermal insulating member 80 is made of insulated material to block electrical conduction between the conductive element 40 and the barrel wall 21, so as to ensure the reliability of the electrical circuit.

It should be pointed out that the area of the conductor terminal 41 may be substantially the same as the cross section of the conductor 50 and smaller than the area of the conductive contact surface 401 of the conductive element 40. In other words, the contact area between the conductor terminal 41 and the conductor 50 is smaller than the contact area between the conductive contact surface 401 and the terminal 301 of the heating element 30. Optionally, the conductor terminal 41 of the conductive element 40 may be integrally connected to the conductor 50, so that the conductive element 40 and the conductor 50 form an integral electrical conductor.

It is worth mentioning that in the manufacturing process, a worker may weld the conductor 50 and the conductor terminal 41 of the conductive element 40 together in advance, and then align and install the conductive contact surface 401 of the conductive element 40 to the terminal 301 of the corresponding heating element 30 installed on the lens element 10, thereby reducing the installation difficulty and improving the product yield.

Figure 16A:
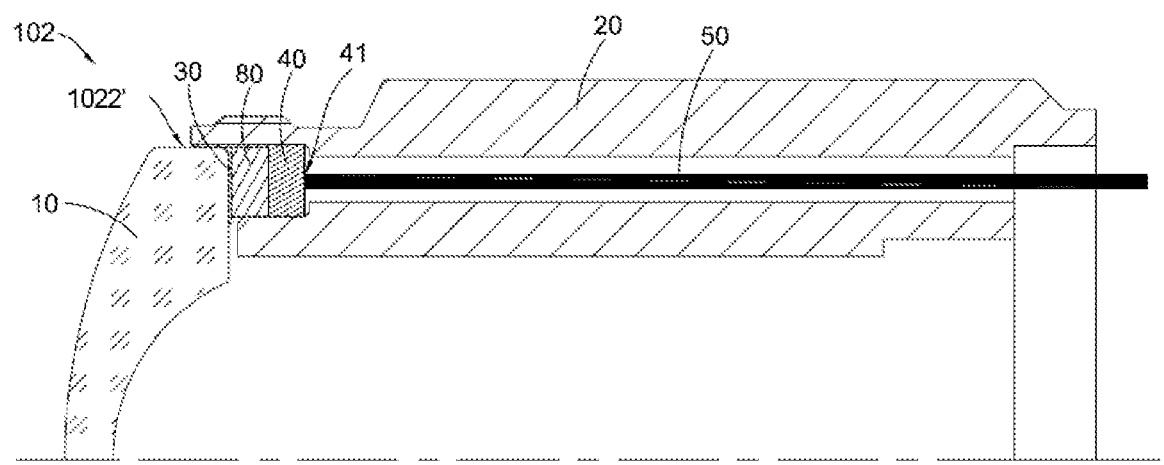
FIG. 16A is a schematic partial cross-sectional view of a third modified implementation of the optical device according to the above-mentioned preferred embodiment of the present disclosure.
Figure 16B:
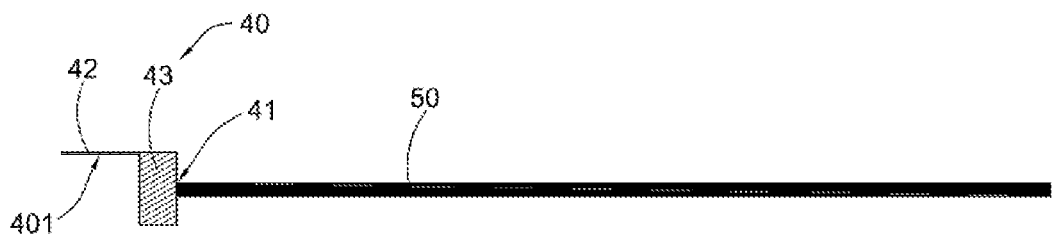
FIG. 16B is a schematic cross-sectional view of a conductive element of the third modified implementation of the optical device according to the above-mentioned preferred embodiment of the present disclosure.

As shown in FIGS. 16A and 16B, in the third modified implementation of this embodiment, the heating element 30 is arranged in the peripheral region 1023' of the inner surface of the first lens element 11, wherein the terminal 301 of the heating element 30 is extended on the side surface 1022' of the first lens element 11, wherein the first conductive element 42 of the conductive element 40 is disposed between the side surface 1022' of the first lens element 11 and the barrel wall 21, and the conductive contact area 401 is in electrical contact with the terminal 301, wherein the second conductive element 43 is fixed and held in the fixed cavity 201', and wherein the first conductive element 42 and the second conductive element 43 are integrally connected to form an L-shaped structure. The thermal insulating member 80 is disposed on the outside of the heating element 30 in a manner to reduce heat loss, thereby reducing the heat dissipation of the heating element 30. Further, the thermal insulating member 80 is installed between the second conductive element 43 and the heating element 30, and the second conductive element 43 is fixed and held in the fixed cavity 201', thereby preventing loosening during heating up or when the optical device 100 moves and affecting the heat generation efficiency of the heating element 30.

Figure 17:
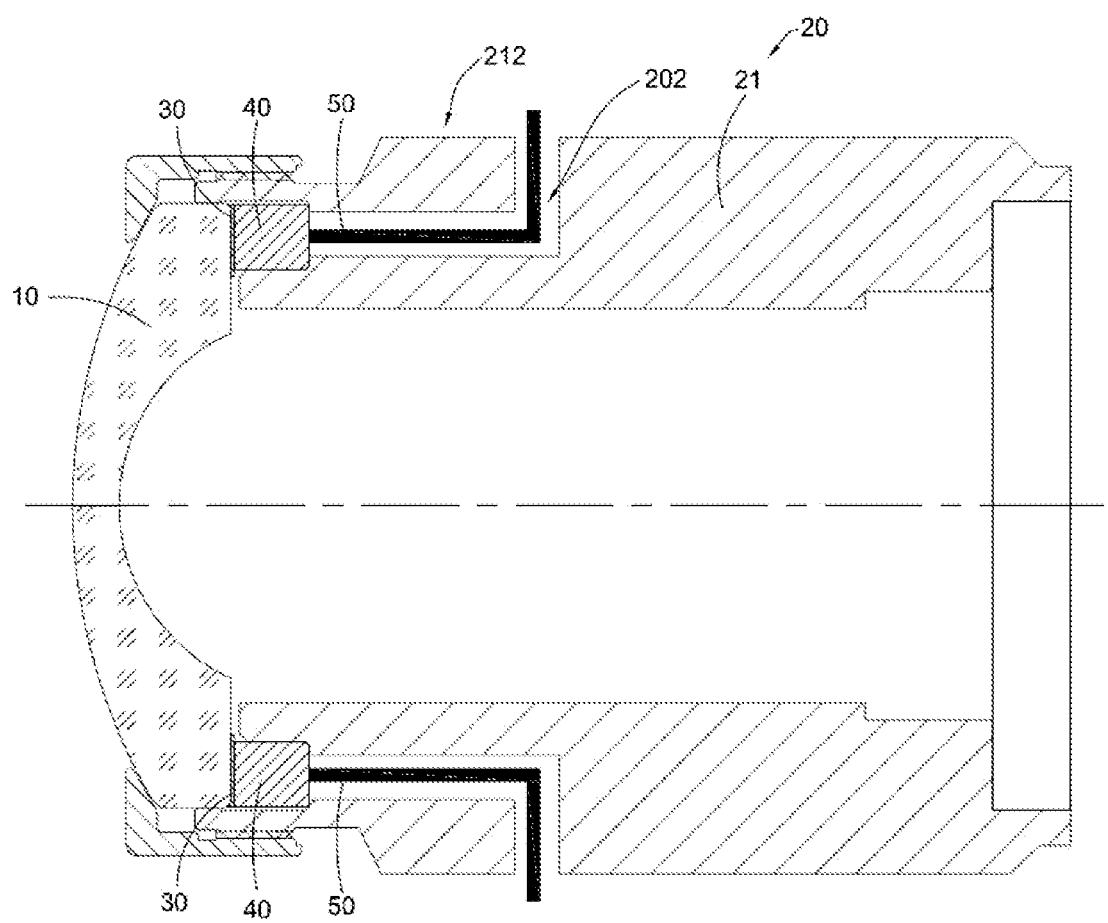
FIG. 17 is a schematic cross-sectional view of the optical device according to the above preferred embodiment of the present disclosure, in which a conductor is lead out from a side wall of a lens barrel.

In this embodiment, optionally, the conductor channel 202 extends from the fixed cavity 201' along the inside of the barrel wall 21 to the bottom 211 of the barrel wall 21, so that the conductor 50 leads out from the bottom 211 of the barrel wall 21 and is connected to the power supply device. As shown in FIG. 17, optionally, the conductor channel 202 is led out from the fixed cavity 201' to the outside of the side wall of the barrel wall 21, so that the conductor 50 is led out from a side part 212 of the barrel wall 21 and is connected to the power supply device.

It can be understood that the conductor channel 202 may be implemented as one, wherein the conductor 50 of the positive electrode and the conductor 50 of the negative electrode each extend outward along the conductor channel 202. Optionally, the conductor channels 202 may be implemented as two, wherein the two conductor channels 202 may be preferably symmetrically disposed on two sides of the barrel wall 21 of the lens barrel 20, wherein the conductor 50 of the positive electrode extends outward along one of the conductor channels 202, and wherein the conductor 50 of the negative electrode extends outward along the other conductor channel 202. Of course, the two conductor channels 202 may also not need to be symmetrically disposed, which is not limited here.

Figure 18A:
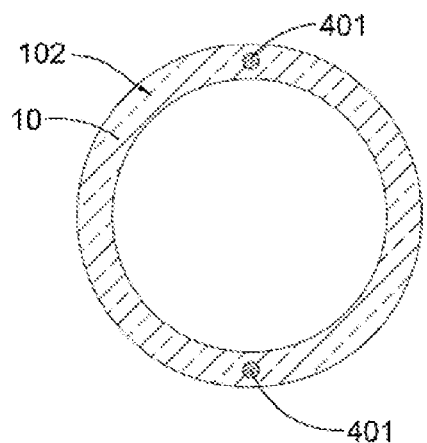
FIG. 18A is a schematic plan view of the optical device according to the above preferred embodiment of the present disclosure, in which two conductive elements of a dot-like structure are symmetrically located on two sides of the lens element.

As shown in FIG. 18A, in this embodiment, the two terminals 301 of the heating element 30 are symmetrically disposed on two sides of the non-clear region 102 of the first lens element 11, wherein one of the conductive elements 40 is fixed and held at a position in electrical contact and connection with one of the terminals 301, wherein the other conductive element 40 is fixed and held at a position in electrical contact and connection with the other terminal 301, wherein the conductive contact surfaces 401 of the two conductive elements 40 are each implemented as a dot-like surface structure, wherein the area of the conductive contact surface 401 is adapted so as to be substantially consistent with the area of the terminal 301 of the heating element 30.

Figure 18B:
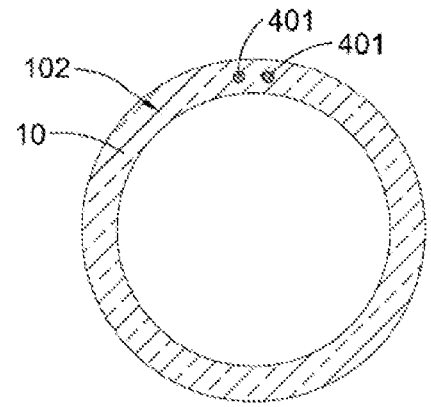
FIG. 18B is a schematic plan view of the optical device according to the above preferred embodiment of the present disclosure, in which two conductive elements of a dot-like structure are located on the same side of the lens element.

As shown in FIG. 18B, optionally, the two terminals 301 of the heating element 30 are separated from each other and disposed on the same side of the non-clear region 102 of the first lens element 11, wherein one of the conductive elements 40 is fixed and held at a position in electrical contact and connection with one of the terminals 301, wherein the other conductive element 40 is fixed and held at a position in electrical contact and connection with the other terminal 301, and wherein the conductive contact surfaces 401 of the two conductive elements 40 are each implemented as a dot-like surface structure and do not contact each other.

Figure 18C:
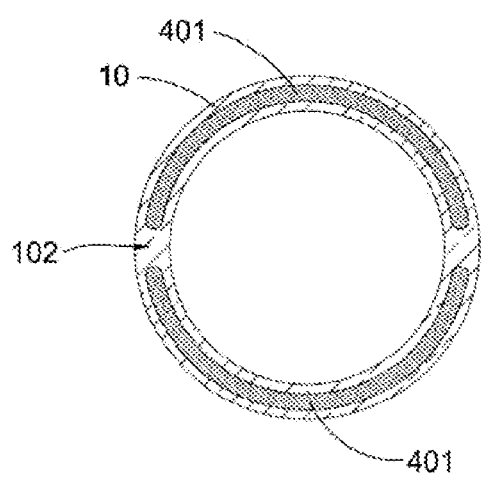
FIG. 18C is a schematic plan view of the optical device according to the above-mentioned preferred embodiment of the present disclosure, in which two conductive elements with equal arc-shaped structures are located on two sides of the lens element.
Figure 18D:
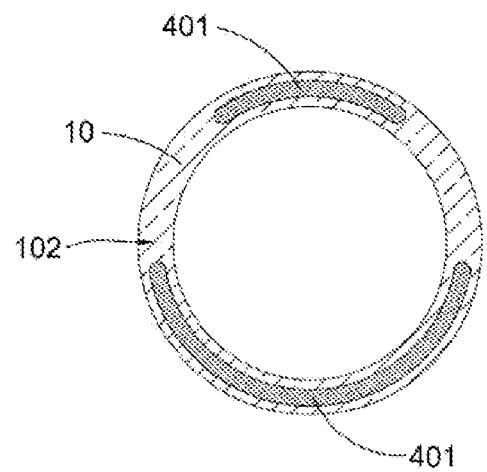
FIG. 18D is a schematic plan view of the optical device according to the above-mentioned preferred embodiment of the present disclosure, in which two conductive elements with arc-shaped structures of different arc lengths are located on two sides of the lens element.

As shown in FIG. 18C, optionally, the conductive contact surfaces 401 of the two conductive elements 40 are each implemented as an arc-shaped surface structure and do not contact each other, wherein one of the conductive elements 40 extends along one side of the periphery of the lens element 11 and is in electrical contact and connection with one of the terminals 301 of the heating element 30, and the other conductive element 40 extends along the other side of the periphery of the first lens element 11 and is in electrical contact and connection with the other terminal 301 of the heating element 30. As shown in FIG. 18D, it can be understood that the arc lengths of the conductive contact surfaces 401 of the two conductive elements 40 may be arbitrarily preset without contacting each other, but do not exceed the range of the non-clear region 102 of the lens element 10, wherein the area of the conductive contact surface 401 may be greater than or equal to the area of the terminal 301 of the heating element 30, so that the contacting surface between the conductive contact surface 401 of the conductive element 40 and the terminal 301 of the heating element 30 may be pre-designed based on actual requirements according to the shape and position of the terminal 301 of the heating element 30, which allows a wider range of applications.

Optionally, the conductive contact surface 401 of one of the conductive elements 40 is implemented as a dot-like surface structure, and the conductive contact surface 401 of the other conductive element 40 is implemented as an arc-shaped surface structure, which is not limited here.

Further, the terminals 301 of the heating element 30 are reserved to be electrically connected to the corresponding conductive contact surfaces 401 of the conductive element 40, and the remaining part of the heating element 30 is subjected to insulation treatment, such as blackening treatment, so that the contacting surface of the heating element 30 and the conductive element 40 may be arbitrarily set, and thus, the contacting surface of the conductive element 40 and the first lens element 11 may be preset. Alternatively, the structure of each terminal 301 of the heating element 30 is designed to match the structure of the conductive contact surface 401 of the conductive element 40, thereby improving the heat generation efficiency of the heating element 30 and reducing the manufacturing process difficulty of the optical device 100.

Further provided in this embodiment is a method for manufacturing the optical device 100, comprising the following steps:

S01. arranging the heating element 30 on the lens element 10;

S02. installing the lens element 10 on the lens barrel 20;

S03. fixing and holding the conductive element 40 at a position in electrical contact with the terminal 301 of the heating element 30, wherein the conductive element 40 has the conductive contact surface 401, and wherein the conductive contact surface 401 is electrically connected to the terminal 301 of the heating element 30 in a surface contact manner; and S04. extending the conductor 50 from the conductive element 40 along the conductor channel 202 of the barrel wall 21 to the outside of the lens barrel 20 so as to be connected to the power supply device for electric power supply.

Optionally, in the step S03, the conductive element 40 and the heating element 30 located on the first lens element 11 are bonded by the conductive adhesive 60 and kept relatively fixed.

Optionally, in the step S03, the conductive element 40 is fixed and held by the fixing element 70 at a position in contact and electrical connection with the terminal 301 of the heating element 30 located on the first lens element 11.

Optionally, in the step S03, the thermal insulating member 80 is fixed and held on the outside of the lens element 10, wherein the thermal insulating member 80 is installed between the lens element 10 and the lens barrel 20, and provides a force so that the conductive element 40 and the lens element 10 are kept relatively fixed, wherein the thermal insulating member 80 is electrically insulated and thermal insulating, and wherein the conductive element 40 is fixed and held between the thermal insulating member 80 and the lens element 10, and is in electrical contact with the terminal 301.

Figure 19:
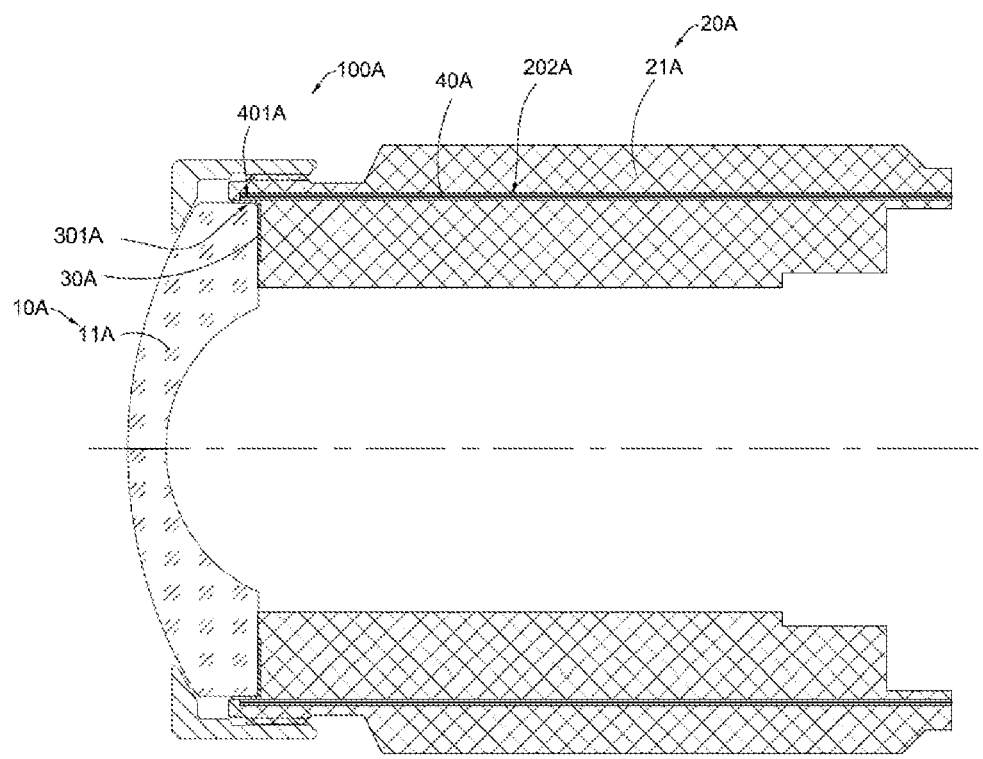
FIG. 19 is a schematic cross-sectional view of an optical device according to a first modified embodiment of the present disclosure.
Figure 20:
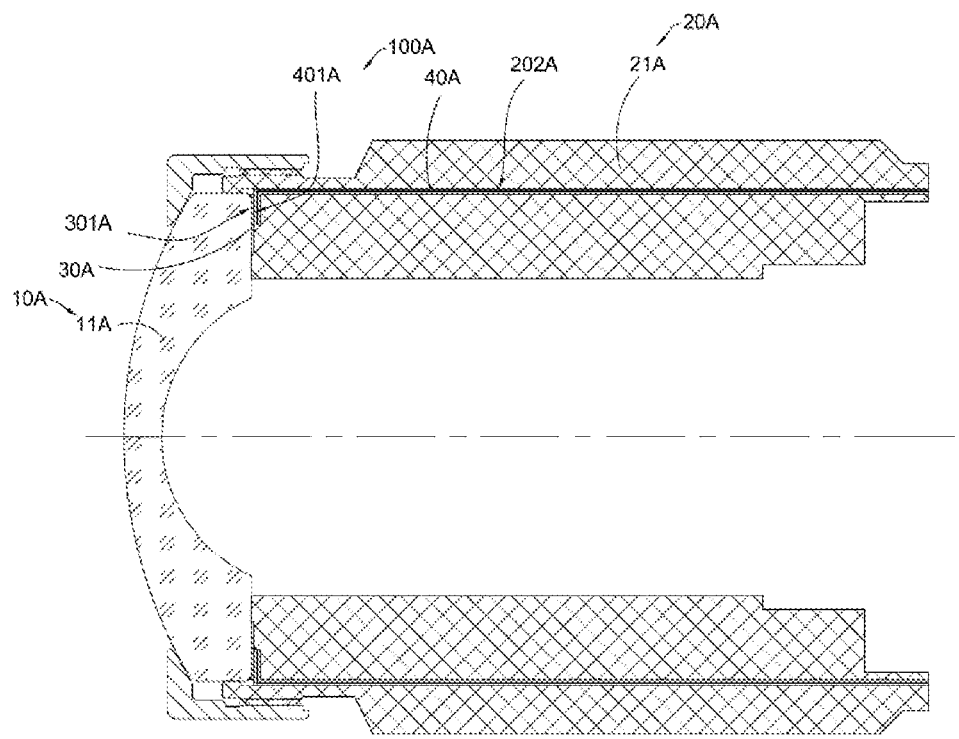
FIG. 20 is a schematic cross-sectional view of another implementation of the optical device according to the above-mentioned first modified embodiment of the present disclosure.

An optical device 100A of the first modified implementation of the present disclosure in the second configuration form of the present application is as shown in FIGS. 19 and 20, wherein the optical device 100A is different from the optical device 100 of this preferred embodiment in that the optical device 100A comprises at least one lens element 10A, a lens barrel 20A, at least one heating element 30A, and at least two conductive elements 40A, wherein the lens barrel 20A is implemented as a plastic lens barrel or a lens barrel made of non-conductive material, wherein the lens element 10A is installed on the lens barrel 20A, wherein the heating element 30A is arranged on a first lens element 11A near the object side of the lens element 10A, and wherein the heating element 30A has at least two terminals 301A. The lens barrel 20A comprises a barrel wall 21A, wherein the barrel wall 21A is made of plastic material or non-conductive material, wherein the barrel wall 21A has at least two conductor channels 202A, wherein the at least two conductor channels 202A do not communicate with each other and extend from the position of the terminal 301A of the heating element 30A along the inside of the cylindrical wall 21A to the outside of the bottom or side part of the cylindrical wall 21A, wherein the at least two conductive elements 40A are molded by means of injecting conductive paste into the at least two conductor channels 202A and are electrically connected to the corresponding terminal 301A of the heating element 30A, and wherein the conductive element 40A is electrically connected to a power supply device on the outside of the barrel wall 21A, so that the power supply device supplies electric power to the heating element 30A. That is to say, the optical device 100A realizes the arrangement of the conductors in the plastic module by means of injection molding the conductive paste without additional assembly of conductors, making the assembly of the optical device 100A simple, optimizing the appearance, and not affecting the optical performance.

In other words, the conductive element 40A is formed by curing of conductive paste in a molten state or a liquid state, wherein the conductive element 40A does not have the plastic sheath of the traditional line conductor in the outer layer, and the barrel wall 21A is wrapped around the outside of the conductive element 40A, so that the barrel wall 21A and the conductive element 40A are integrally formed as a line conductor-like structure. In the manufacturing process, the conductive paste in the molten state or the liquid state is injected into the conductor channel 202A and extends to the terminal 301A of the heating element 30A, wherein the conductive paste in the molten state or the liquid state is cured and then formed as the conductive element 40A electrically connected to the terminal 301A. Compared with the traditional optical device, the conductive element 40A of this embodiment does not need to be fixed and connected to the terminal 301A of the heating element 30A through a welding process, thereby avoiding the problem of uneven heat generation of the heating element caused by the connection between the heating element and the conductors due to welding or other manners.

As shown in FIG. 19, further, the conductive element 40A has a conductive contact surface 401A, wherein the conductive contact surface 401A is electrically connected to the terminal 301A of the heating element 30A in a surface contact manner. Optionally, the terminal 301A of the heating element 30A is located on the side surface of the first lens element 11A, wherein the conductor channel 202A is extended to the side surface of the first lens element 11A, or in other words, the side surface of the first lens element 11A is exposed to the conductor channel 202A, so that the terminal 301A of the heating element 30A is exposed to the conductor channel 202A. When the conductive paste is injected into the conductor channel 202A, the conductive paste can just extend to contact the terminal 301A of the heating element 30A, so that the conductive element 40A, after the conductive paste being cured and molded, just extends to contact the terminal 301A. As shown in FIG. 20, optionally, the terminal 301A of the heating element 30A is located in the peripheral region of the inner surface of the first lens element, and the conductor channel 202A is extended to the peripheral region of the inner surface of the first lens element 11, or the peripheral region of the inner surface of the first lens element 11 is exposed to the conductor channel 202A, wherein the terminal 301A of the heating element 30A is exposed to the conductor channel 202A, so that the conductive element 40A, after the conductive paste being cured and molded, just extends to contact the terminal 301A.

It is worth mentioning that the area where the terminal 301A of the heating element 30A is exposed to the conductor channel 202A can be preset according to actual needs, so that the contact area between the conductive contact surface 401A of the conductive element 40A and the terminal 301A, formed after the conductive paste being injected into the conductor channel 202A, is preset according to actual requirements. In other words, the area and shape of the conductive contact surface 401A of the conductive element 40A can be preset according to actual requirements, and the contact area between the conductive contact surface 401A and the terminal 301A can be preset. Optionally, the area of the conductive contact surface 401A is substantially consistent with the area of the terminal 301A. Further, the width and extension direction of the conductor channel 202A can be preset, or the area and shape of the first lens element 11A exposed to the conductor channel 202A can be preset, so as to guide the conductive paste in the molten state or the liquid state to form the conductive element 40A with a preset shape after it is cured and molded, wherein the area and shape of the conductive contact surface 401A of the conductive element 40A is preset, so that the contact area between the conductive contact surface 401A and the terminals 301A of the heating element 30A can be preset according to actual requirements. It can be understood that the conductor channels 202A do not communicate with each other, so that the conductive elements 40A that are injection-molded will not be short-circuited, wherein the conductor channels 202A extend to the corresponding terminals 301A of the heating element 30A, respectively, and wherein after the conductive elements 40A are injection-molded in the conductor channels 202A, the conductive elements 40A are are exactly in electrical connection with the corresponding terminals 301A of the heating element 30A, respectively, thereby ensuring the rationality of the electrical circuit.

It should be understood by those skilled in the art that the embodiments of the present disclosure described in the above description and shown in the drawings are only examples and do not limit the present application. The objectives of the present application have been achieved completely and efficiently. The function and structural principles of the present disclosure have been presented and described in the embodiments, and the implementations of the present disclosure may be varied or modified without departing from the principles.

What is claimed is:
1. An optical device, comprising:
at least one lens element;

a lens barrel, wherein the lens barrel has an installation cavity, wherein the lens element is installed in the installation cavity of the lens barrel; and at least one heating element, wherein the at least one heating element is arranged to contact a surface of the lens element near an object side in a manner capable of being powered-on to generate heat, so as to heat the lens element, and wherein pins of the at least one heating element are arranged in a non-clear region of the lens element;

wherein the at least one heating element comprises at least one second heating element arranged in the non-clear region of the lens element, wherein the second heating element has a closed-loop structure with a configuration formed by a plurality of heating wires connected in series to form an entirely closed loop with its ends connected;

wherein upper and lower sides of the second heating element each have a series port so that the outermost electric heating wire of the second heating element and the innermost heating wire of the second heating element are connected in series.

2. The optical device according to claim 1, wherein the at least one heating element further comprises at least one first heating element and at least two first pins electrically connected to the first heating element, wherein the first heating element has a light transmittance property, wherein the first heating element is arranged in a clear region of the lens element, and wherein the at least two first pins are separated from each other and disposed in the non-clear region of the lens element; wherein the two first pins are disposed on two sides of the non-clear region of the lens element in such a manner that the first heating element generates heat uniformly.

3. The optical device according to claim 2, wherein the first heating element is further arranged in the non-clear region of the lens element, wherein the first heating element is implemented as an ITO film.

4. The optical device according to claim 1, wherein the at least one heating element comprises at least two second pins, and wherein the at least two second pins are separated from each other and arranged on the second heating element; wherein the second heating element is covered on a part of the non-clear region or covered over all of the non-clear region; wherein the two second pins are disposed on two sides of the second heating element in such a manner that the second heating element generates heat uniformly.

5. The optical device according to claim 4, wherein the second heating element has a plurality of ring rows of protrusions, wherein the number of the protrusions is configured to match a resistance value of the second heating element.

6. The optical device according to claim 4, wherein the second heating element is implemented as an electric heating wire.

7. The optical device according to claim 4, wherein a shape of the second heating element is configured to match a resistance value of the second heating element.

8. The optical device according to claim 1, wherein the second heating element comprises at least one second pin having a strip shape.

9. An optical device, comprising:
at least one lens element;
a lens barrel, wherein the lens element is installed on the lens barrel;
at least one heating element; and at least two conductive elements, wherein the heating element is disposed on the lens element, wherein the heating element has at least two terminals, wherein the at least two conductive elements are fixed to positions in contact and electrical connection with corresponding terminals, respectively, wherein the conductive elements each have a conductive contact surface, wherein the conductive contact surface is electrically connected to the terminals of the heating element in a surface contact manner, and wherein the at least two conductive elements are used to be connected to a power supply device so that the power supply device supplies electric power to the heating element to heat the lens element;

wherein the optical device further comprises a conductive adhesive which is a cured or dried adhesive with electrical conductivity, and wherein the conductive contact surface of the conductive elements is bonded and fixed to a position in electrical contact with the terminals of the heating element through the conductive adhesive;

wherein the optical device further comprises at least one fixing element, and wherein the conductive elements are fixed and held by the fixing element at positions in contact and electrical connection with the terminals of the heating element;

wherein the optical device further comprises a thermal insulating member disposed on the lens element in a manner to reduce heat dissipation from the heating element, wherein the conductive elements are fixed and held between the thermal insulating member and the lens element and are in electrical contact with the terminals, and the thermal insulating member covers at least a portion of the conductive elements.

10. The optical device according to claim 9, wherein an area of the conductive contact surface is greater than or equal to an area of the terminal.

11. The optical device according to claim 9, further comprising at least two conductors, wherein the at least two conductors are electrically connected to corresponding conductive elements, respectively, so that the conductive elements access the power supply device through the conductors.

12. The optical device according to claim 11, wherein the lens barrel has at least one fixed cavity and at least one conductor channel, wherein the fixed cavity is located between the lens element and a barrel wall of the lens barrel, wherein the conductive elements are installed in the fixed cavity and is in electrical contact with the terminals of the heating element, wherein the fixing element is installed between the conductive elements and the barrel wall and provides a force so that the conductive elements and the lens element are kept relatively fixed, and wherein the conductor channel communicates with the fixed cavity and extends outward along the barrel wall, so that the conductors extend outward from the conductive elements along the conductor channel.

13. The optical device according to claim 11, wherein the thermal insulating member is installed between the lens element and a wall of the lens barrel, and provides a force so that the conductive elements and the lens element are kept relatively fixed, and wherein the thermal insulating member is electrically insulated and thermal insulating.

14. The optical device according to claim 9, wherein a contacting surface between the conductive contact surface of the conductive element and the terminal of the heating element is configured to match a shape and position of the terminal of the heating element.

15. The optical device according to claim 9, wherein the lens barrel has a barrel wall, wherein the barrel wall is made of non-conductive material, wherein the barrel wall has at least two conductor channels that do not communicate with each other, wherein the at least two conductor channels are extended to corresponding terminals of the heating element, respectively, and wherein the at least two conductive elements are cured and molded by injecting conductive paste into the at least two conductor channels, respectively, so that the at least two conductive elements are electrically connected to the corresponding terminals, respectively.

16. The optical device according to claim 9, wherein each conductive element includes a first conductive element and a second conductive element which are integrally connected to form an L-shaped structure, wherein the first conductive element and the second conductive element are formed from the same conductive material or separately formed from different conductive materials.

17. The optical device according to claim 9, wherein the conductive contact surface of each conductive element has two arc-shaped surface structures, which do not contact each other.

18. A method for manufacturing an optical device, comprising the following steps:
   A. arranging at least one heating element on at least one lens element, wherein the heating element has two terminals;
   B. installing the lens element in a lens barrel; and
   C. fixing and holding at least two conductive elements at positions in electrical contact with corresponding terminals of the heating element, respectively, wherein the conductive elements each have a conductive contact surface, wherein the conductive contact surface is electrically connected to the terminals of the heating element through a conductive adhesive in a surface contact manner, and wherein the at least two conductive elements are used to be connected to a power supply device so that the power supply device supplies electric power to the heating element to heat the lens element, and wherein step A and step B can be interchanged in order, and a fixing element is provided, wherein the conductive elements are fixed and held by the fixing element at positions in contact and electrical connection with the terminals of the heating element, and a thermal insulating member is provided to dispose on the lens element in a manner to reduce heat dissipation from the heating element, wherein the conductive elements are fixed and held between the thermal insulating member and the lens element and are in electrical contact with the terminals, and the thermal insulating member covers at least a portion of the conductive elements.

19. An optical device, comprising:
   at least one lens element;
   a lens barrel, wherein the lens barrel has an installation cavity, wherein the lens element is installed in the installation cavity of the lens barrel; and
   at least one heating element, wherein the at least one heating element is arranged to contact a surface of the lens element near an object side in a manner capable of being powered-on to generate heat, so as to heat the lens element, and wherein pins of the at least one heating element are arranged in a non-clear region of the lens element;
   wherein the at least one heating element comprises at least one second heating element arranged in the non-clear region of the lens element, wherein the second heating element has a closed-loop structure with a single annular heating wire;
   wherein the second heating element comprises a first sub-heating element, a second sub-heating element, and two second pins, wherein the second sub-heating element is integrally connected to two ends of the first sub-heating element to form a ring-shaped structure with different widths, and wherein a width of the first sub-heating element is larger than a width of second sub-heating element, and the two second pins are arranged at the two ends of the first sub-heating element.

* * * * *